US011933100B2

(12) United States Patent
Rehme et al.

(10) Patent No.: US 11,933,100 B2
(45) **Date of Patent: *Mar. 19, 2024**

(54) METALLIC FENESTRATION SYSTEMS WITH IMPROVED THERMAL PERFORMANCE AND METHODS OF MANUFACTURING SAME

(71) Applicant: Rehme Custom Doors & Lighting, Inc., Spicewood, TX (US)

(72) Inventors: Peter James Rehme, Spicewood, TX (US); Aaron Hawkins, Fort Wayne, IN (US); Mark Joseph Rehme, Briarcliff, TX (US)

(73) Assignee: REHME CUSTOM DOORS & LIGHTING, INC., Spicewood, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/548,335

(22) Filed: Dec. 10, 2021

(65) Prior Publication Data

US 2022/0098920 A1 Mar. 31, 2022

Related U.S. Application Data

(63) Continuation of application No. 17/099,460, filed on Nov. 16, 2020, now Pat. No. 11,248,412.

(60) Provisional application No. 62/937,017, filed on Nov. 18, 2019.

(51) Int. Cl.
*E06B 3/263* (2006.01)
*E06B 3/12* (2006.01)

(52) U.S. Cl.
CPC ................ *E06B 3/263* (2013.01); *E06B 3/12* (2013.01); *E06B 2003/26396* (2013.01)

(58) Field of Classification Search
CPC ........ E06B 3/263; E06B 3/12; E06B 3/26301; E06B 3/26303; E06B 3/26305; E06B 3/26388; E06B 3/26343; E06B 3/5409; E06B 3/267; E06B 2003/26396; E06B 2003/26325; E06B 2003/2633; E06B 2003/26322; E06B 2003/7078; E06B 1/6069; E06B 1/325; E06B 1/12
See application file for complete search history.

(56) References Cited

U.S. PATENT DOCUMENTS 2,872,713 A * 2/1959 Haas .................. E06B 3/26301 52/172
3,024,881 A * 3/1962 Haas ......................... E06B 3/60 52/204.593

(Continued)

*Primary Examiner* — Kyle J. Walraed-Sullivan
(74) *Attorney, Agent, or Firm* — SPRINKLE IP LAW GROUP

(57) ABSTRACT

Thermally broken fenestration systems are provided that improve performance characteristics or combinations thereof, including strength and thermal conductivity. Embodiments disclosed include one or more fenestration frame assemblies, each having an interior frame member and an exterior frame member. The interior frame members and exterior frame members are coupled together via a plurality of bridges distributed along the length of the respective fenestration frame assembly. The bridges provide structural rigidity, while providing a plurality of air gaps between interior frame member and the exterior frame member to provide a thermal break.

17 Claims, 21 Drawing Sheets

(56) References Cited

U.S. PATENT DOCUMENTS

| | | | | |
|---|---|---|---|---|
| 3,093,217 | A * | 6/1963 | Doede | E04B 2/96 52/206 |
| 3,470,598 | A * | 10/1969 | Berthelsen | B29C 48/154 29/897.312 |
| 3,527,011 | A * | 9/1970 | Bloom | E04B 2/962 52/204.593 |
| 3,916,503 | A * | 11/1975 | Chenevert | E06B 3/26305 29/450 |
| 3,992,843 | A * | 11/1976 | DiFazio | E06B 3/645 52/204.593 |
| 4,107,893 | A * | 8/1978 | Rensch | E04B 1/24 52/775 |
| 4,118,266 | A * | 10/1978 | Kerr | E06B 3/26336 156/293 |
| 4,342,144 | A * | 8/1982 | Doguchi | E06B 3/26347 264/139 |
| 4,432,179 | A * | 2/1984 | Bachmann | E06B 1/325 52/204.593 |
| 4,720,951 | A * | 1/1988 | Thorn | B29C 44/18 49/DIG. 2 |
| 4,815,245 | A * | 3/1989 | Gartner | E06B 3/26343 49/DIG. 1 |
| 4,965,030 | A * | 10/1990 | Thorn | E06B 3/22 264/328.12 |
| 5,038,537 | A * | 8/1991 | Frambach | E06B 3/325 52/207 |
| 5,511,352 | A * | 4/1996 | Sholton | E04C 1/42 49/501 |
| 5,800,660 | A * | 9/1998 | Brickenstein | B29C 65/78 156/264 |
| 6,035,600 | A * | 3/2000 | Habicht | E06B 3/26305 52/717.02 |
| 6,877,289 | B2 * | 4/2005 | Yao | E06B 3/74 52/455 |
| 8,484,902 | B1 * | 7/2013 | Brown | E06B 3/26341 49/504 |
| 8,572,929 | B2 * | 11/2013 | Stumm | E06B 3/67 52/783.1 |
| 8,813,442 | B1 * | 8/2014 | Edwards | E06B 3/5892 52/204.5 |
| 9,441,412 | B1 * | 9/2016 | Hooper, Jr. | E06B 3/263 |
| 9,790,731 | B1 * | 10/2017 | Bishman | E06B 1/6015 |
| 9,995,081 | B1 * | 6/2018 | Shearman | E06B 3/66323 |
| 10,107,027 | B1 * | 10/2018 | Weavers | E06B 3/30 |
| 10,233,689 | B1 * | 3/2019 | Jones | E06B 7/14 |
| 10,337,239 | B2 * | 7/2019 | Header | E06B 7/14 |
| 2001/0023557 | A1 * | 9/2001 | Graham | E06B 1/6069 49/504 |
| 2002/0020124 | A1 * | 2/2002 | Kusano | E05D 7/02 52/213 |
| 2007/0193205 | A1 * | 8/2007 | Hill | E06B 3/267 52/745.15 |
| 2009/0025325 | A1 * | 1/2009 | Gillespie | E06B 3/267 52/309.14 |
| 2009/0211190 | A1 * | 8/2009 | Honey | E06B 5/12 52/309.3 |
| 2009/0226660 | A1 * | 9/2009 | Dampierre | E06B 3/26301 428/66.4 |
| 2013/0145704 | A1 * | 6/2013 | Stein, Jr. | E06B 1/02 52/204.1 |
| 2014/0053488 | A1 * | 2/2014 | Lenox | E06B 1/36 52/404.1 |
| 2014/0069034 | A1 * | 3/2014 | Jones | E06B 3/585 52/171.3 |
| 2014/0072735 | A1 * | 3/2014 | Jones | E06B 3/6612 428/34 |
| 2014/0109499 | A1 * | 4/2014 | Nieminen | E06B 3/66361 52/204.593 |
| 2014/0331576 | A1 * | 11/2014 | Brown | E06B 3/26341 52/204.5 |
| 2015/0252612 | A1 * | 9/2015 | Charlton | E06B 3/5892 52/656.5 |
| 2017/0218681 | A1 * | 8/2017 | Siddiqui | E06B 1/52 |
| 2019/0119973 | A1 * | 4/2019 | Hatzky | E06B 3/273 |
| 2019/0284866 | A1 * | 9/2019 | Marinack, Jr. | E06B 3/26 |
| 2019/0390506 | A1 * | 12/2019 | Gagne | E06B 3/56 |
| 2020/0087977 | A1 * | 3/2020 | Capoferri | E06B 3/12 |
| 2020/0102782 | A1 * | 4/2020 | Ortuzar | E06B 3/025 |
| 2020/0102783 | A1 * | 4/2020 | Ortuzar | C23C 14/205 |
| 2020/0199932 | A1 * | 6/2020 | Jones | E06B 1/02 |
| 2020/0238795 | A1 * | 7/2020 | McCoy | B60J 1/008 |

* cited by examiner

METALLIC FENESTRATION SYSTEMS WITH IMPROVED THERMAL PERFORMANCE AND METHODS OF MANUFACTURING SAME

CROSS-REFERENCE TO RELATED APPLICATION(S)

This application is a continuation of, and claims a benefit of priority under 35 U.S.C. 120 of, U.S. patent application Ser. No. 17/099,460 filed Nov. 16, 2020, issued as U.S. Pat. No. 11,248,412, entitled "METALLIC FENESTRATION SYSTEMS WITH IMPROVED THERMAL PERFORMANCE AND METHODS OF MANUFACTURING SAME," which claims a benefit of priority under 35 U.S.C. § 119(e) from U.S. Provisional Application No. 62/937,017, filed Nov. 18, 2019, entitled "METALLIC FENESTRATION SYSTEMS WITH IMPROVED THERMAL PERFORMANCE AND METHODS OF MANUFACTURING SAME," which is fully incorporated by reference herein for all purposes.

COPYRIGHT NOTICE

A portion of the disclosure of this patent document contains material to which a claim for copyright is made. The copyright owner has no objection to the facsimile reproduction by anyone of the patent document or the patent disclosure as it appears in the Patent and Trademark Office patent file or records but reserves all other copyright rights whatsoever.

TECHNICAL FIELD

The present disclosure relates to fenestration systems (e.g., windows, doors, skylights or other openings in structures). More particularly, the present disclosure relates to thermally broken fenestration systems. Even, more particularly, this disclosure relates to metallic thermally broken fenestration systems with improved performance characteristics or combinations thereof, including strength, thermal conductivity, weight or condensation resistance.

BACKGROUND

Typical metallic fenestration systems (such as windows, doors, or skylights) have poor thermal performance. This includes poor resistance to thermal transfer (e.g., heat/cold flows) and condensation. Windows, doors, skylights and other fenestration systems need to become more thermally efficient as building codes evolve.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
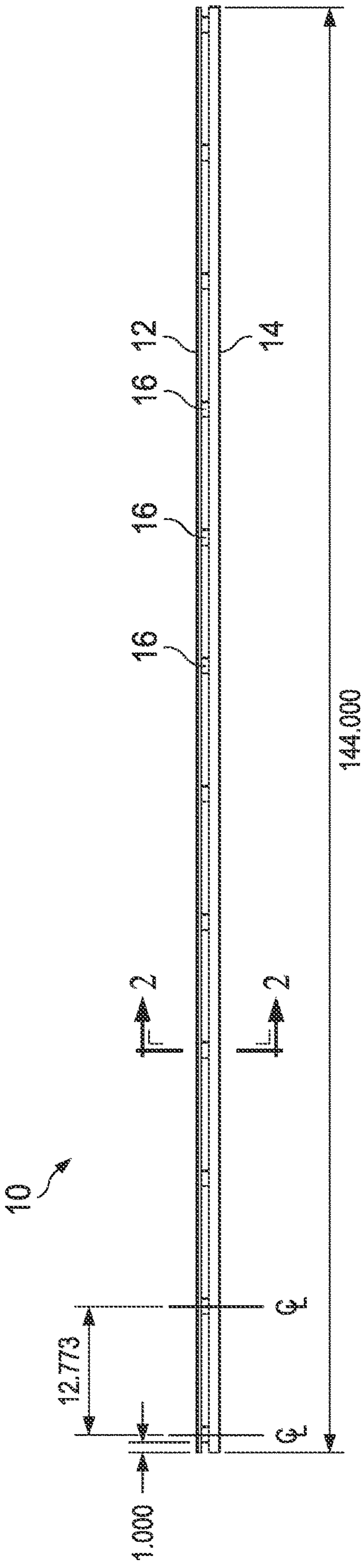
FIG. 1 is a top view of a fenestration frame assembly.

Fenestration systems and related methods for their manufacture and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed, there is a need for more thermally efficient fenestration systems. One way of increasing thermal efficiency is to improve the glazing characteristics of the fenestration system. Glazing or glass is placed inside window frames in a number of orientations. The most typical form in current fenestration systems are insulated glass units (IGU). These units take two or more panes of glass, separate them with a lower conductivity bridge (spacer), seal the edges with a flexible sealant, and fill the created gap between the panes with an inert gas. These improvements alone, have proved inadequate to address the thermal inefficiencies of such fenestration systems.

Accordingly, previous attempts to address this issue, have created fenestration systems with a “thermal break” by separating an interior facing portion of the fenestration system (e.g., an interior frame) from the exterior facing portion (e.g., an exterior frame) with a barrier to reduce thermal conductivity. These thermal breaks thus include sections of lower conductivity material; thermoplastics, fiber reinforced plastics, urethanes. These sections are connected to the interior and exterior frame components with mechanical fasteners, mechanical crimping, bonding with adhesives, or in the case of urethanes, poured in-place. Thus, these previous solutions may be created by forming two separate surfaces (e.g., an interior frame and an exterior frame) and joining these separate surfaces using a spacer (e.g., a plastic spacer) that is glued, mechanically fastened, mechanically crimped in-place, or in the case of urethanes, poured in-place.

These existing solutions thus have limitations on size, reinforcement, and configurations. These limitations are caused at least in part by the relative weakness in the resulting fenestration system caused by the structure and materials used to join their surfaces. Accordingly, many of the previous fenestration systems require additional reinforcement to provide structure or additional strength to their assemblies. Some of these reinforcements are made from more highly conductive material, negating any thermal performance benefits of the thermal break. Thus, their thermal performance is also more unpredictable, because of these reinforcements and additional hardware required for fabrication.

To address these issues, among others, embodiments of fenestration systems as disclosed herein may rely on the main metallic framing material (e.g., steel, stainless steel, aluminum alloys, brass, bronze, etc.) to create a thermally broken fenestration systems. Thermal isolation is accomplished by limiting/minimizing connections between interior and exterior framing members (described below). Thus, the connections or bridging between exterior and interior frames of embodiments of fenestration systems disclosed herein may be made using spacers or bridges comprised of the same, or a similar material (e.g., metallic or of similar thermal conductivity), as the frame of the fenestration system. These bridges may be welded in place between the interior and exterior frames or, in other embodiments, may be made by removing portions of a (e.g., solid) piece of material joining the interior and external frames or the interior and exterior frames may be formed as a piece and the material removed to create the bridges. Thus, in one embodiment, the bridges create connections between the interior and exterior frames that are made with steel (e.g., which may be welded in-place or otherwise formed). Thus, while the bridges utilized in embodiments may be the same or similar in thermal conductivity to the material of the frames, they are simultaneously of the same or similar strength to the material of the frames. By reducing the number of (e.g., steel or metallic) connections and substituting air (or portions where the frames are not otherwise joined), the thermal performance of embodiments of fenestration systems may be improved to equal or surpass the performance of previous fenestration systems, while simultaneously preserving or increasing the structural integrity of such embodiments.

Accordingly, embodiments as disclosed may create fenestration systems with substantially minimized thermal bridging while remaining a structural steel (or other type of metal) fenestration systems, with all the accordant advantages. Embodiments may include bridges/spacers that connect the frames of the fenestration systems to form a fenestration assembly. A fenestration assembly can be adapted to accept fenestration panels (e.g., windows, door panels, etc.). The bridges can be made with steel or other metals (e.g., that is welded in-place or created by a material removal process such as machining or the like), rather than a plastic material. Thus, one large advantage to embodiments described herein is retaining steel construction, without any need for plastic structure. In some embodiments, there may be no glued bonds for structure and no mechanical connections as, in some embodiments, the bridges are welded to the opposing frame members. As such, embodiments also allow for more consistent thermal performance across a range of sizes and orientations for these fenestration systems. As another advantage, embodiments of fenestration systems may be fabricated from stock material (described below), which may allow for simpler manufacture or fabrication. As yet another advantage, embodiments may also allow for easily accommodating structures within such fenestration systems, including for example, a reveal for weather-stripping on particular embodiments.

To illustrate embodiments now in more detail, as will be recalled, steel and other metals have a high rate of thermal conductivity. When used in windows, doors, skylights or other fenestration systems in exterior applications, these characteristics can lead to condensation, and conduction of exterior conditions into an interior space. This yields an uncomfortable and inefficient space.

Thermally broken fenestration systems have been created to address these issues. Previous types of these systems are, however, inferior. These previous fenestration systems rely on plastics, or thermoplastics to separate the exterior and interior surfaces. These plastics are attached with mechanical fasteners, cast-in place, or crimped in place. As a result, fenestration systems constructed in this manner tend to have a flimsy feel, and rely on the plastic as structure, not just as a thermal break. They also require additional reinforcement, and exhibit unreliable thermal performance.

In contrast, embodiments as disclosed herein can have a full-steel or metallic structure, and do not rely on plastics/thermoplastics/urethanes for any structural integrity. Embodiments are thus fully metallic, while minimizing the amount of thermal bridging. The minimization of thermal bridging may be accomplished according to various embodiments by separating the exterior and interior frame materials with an air gap, set by small steel spacers or bridges. These bridges set a consistent gap, and reduce the cross-sectional areas of thermal pathways. The number and sizing of bridges can be determined by finding a suitable compromise between a desired thermal performance (using the assumption that fewer bridges is more desirable thermally) and a desired structural performance (e.g., rigidity, resistance to flex, etc.). The size, shape, and spacing of the bridges in particular embodiments are a suitable compromise between thermal performance with fewer and smaller bridges and improved structural performance. A designer of a fenestration system can take many factors into consideration when balancing strength versus thermal properties of a fenestration system. For example, in some applications, a designer may have a goal of certain thermal properties in response to building codes or energy efficiency. The designer can determine a minimum level of thermal breaking required, and choose size, number, shape, etc. of bridges to achieve that goal. In another example, a designer may have a minimum strength requirement, and may choose the minimum number/size/etc. of bridges to use, to achieve the structural requirement, while maximizing the thermal properties. As one skilled in the art would understand, a designer can fine-tune any number of factors that affect structural integrity, thermal properties, cost, ease of manufacture, etc., to design an optimal fenestration frame and fenestration assembly. As a general rule, a designer may have a goal of using as little steel as possible without sacrificing rigidity. Embodiments may thus be applicable to all fenestration systems, including windows, doors, and skylights of both fixed and operable (moveable) assemblies and may be usefully applied in the construction of windows, doors, and skylights in both residential and commercial application.

Figure 2:
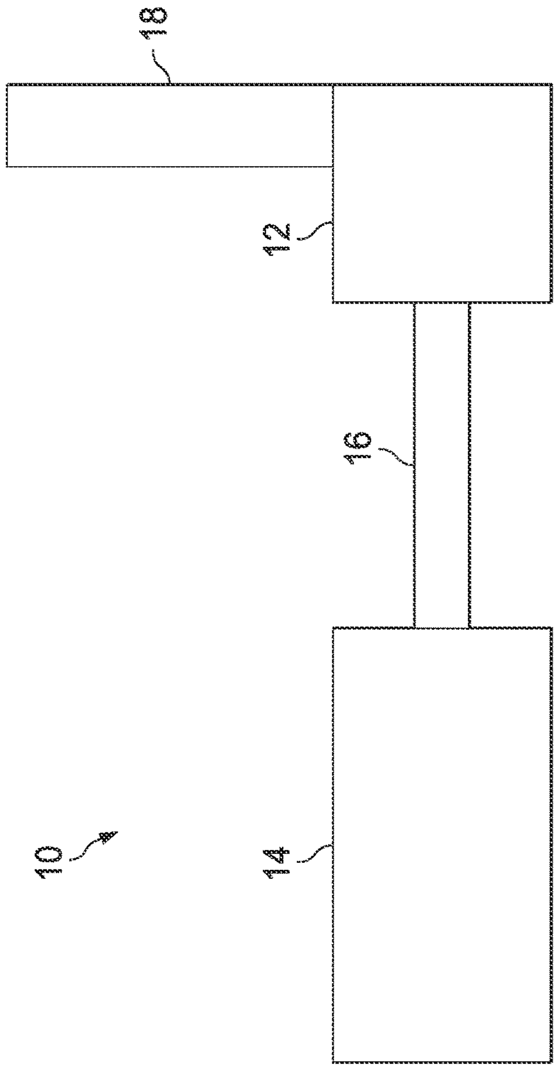
FIG. 2 is a sectional view of the fenestration frame assembly taken along line 2-2 of FIG. 1.
Figure 3:
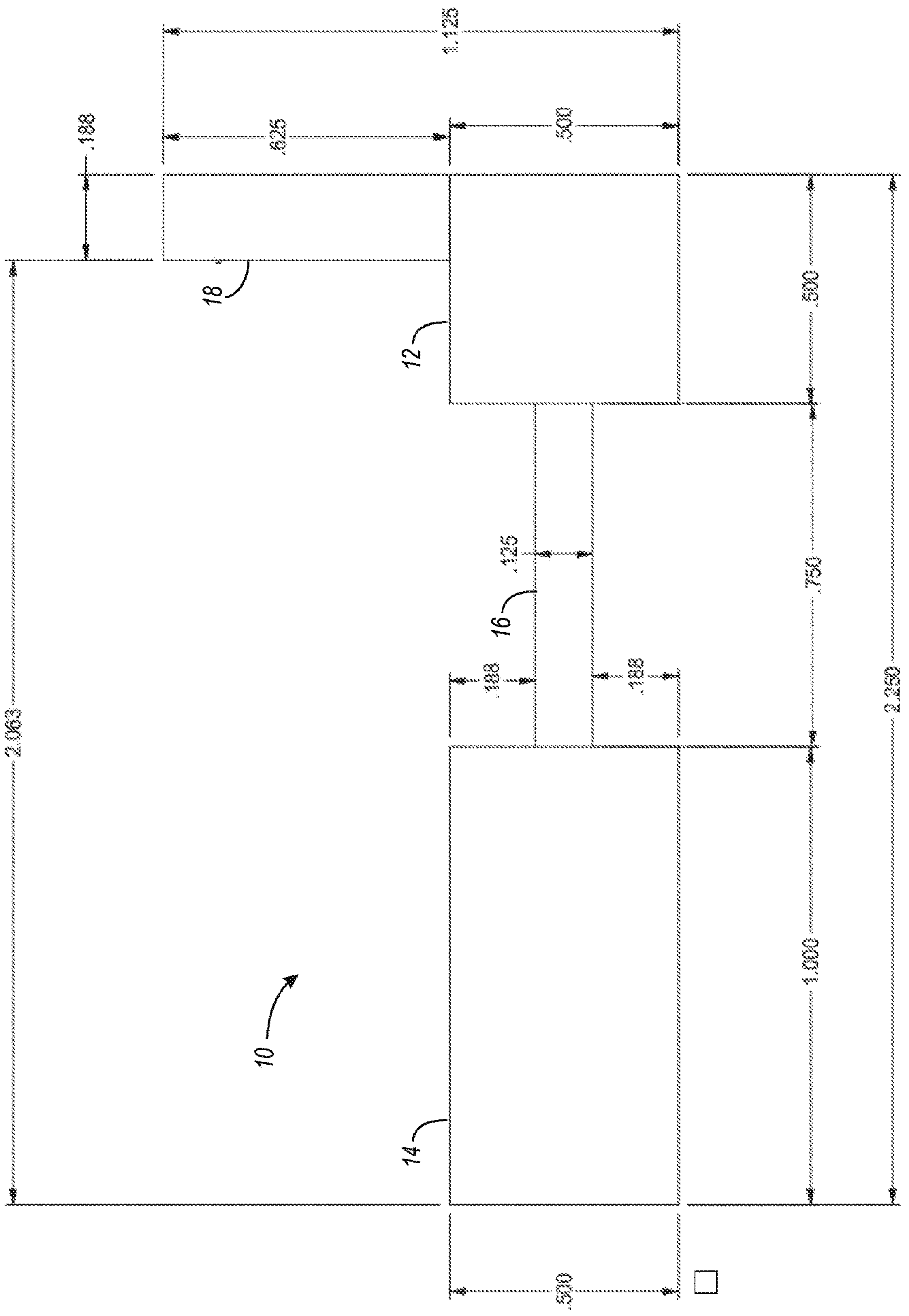
FIG. 3 is the fenestration frame assembly of FIG. 2, showing exemplary dimensions.

Turning then to the figures, FIGS. 1-3 illustrate one embodiment of a completed profile of a fenestration frame assembly (e.g., an exterior frame member coupled to an interior frame member frame by with bridges). FIG. 1 is a top view of a fenestration frame assembly 10 comprising an interior fenestration member 12 and an exterior fenestration member 14. Note that, in various figures, exemplary dimensions are provided. These exemplary dimensions are merely examples, as dimensions, spacings, materials, etc., can be chosen by a designer to achieve desired results, as one skilled in the art will understand. In the example shown in FIG. 1, the fenestration frame assembly 10 is a 12 foot stock frame member that can be used to manufacture numerous types of fenestration assemblies for fenestration systems. In the example shown, a plurality of bridges 16 are coupled to the interior and exterior frame members 12 and 14 to provide strength to the fenestration frame assembly 10, while also providing a thermal break between the interior and exterior fenestration members.

FIG. 2 is a sectional view of the fenestration frame assembly 10, taken along line 2-2 of FIG. 1. As shown, the section is taken through one of the bridges 16. In this example, the interior frame member 12 is separated from the exterior frame member 14 by the bridges 16. A glazing stop 18 is also coupled to the interior frame member 12. Over most of the length of the fenestration frame assembly 10, the interior and exterior members are separated by an air gap (i.e., between bridges). However, enough bridges 16 are provided such that the assembled fenestration frame assembly 10 has suitable structural rigidity to be used to manufacture fenestration systems.

As discussed above, if more strength is needed, the dimensions of the various components can be fine-tuned, more bridges added, etc. to achieve a desired result, while still providing a desired thermal break. FIG. 3 shows the fenestration frame assembly 10 shown in FIGS. 1 and 2, with exemplary dimensions of one embodiment. As discussed, these dimensions can be customized, as needed, to achieved desired results.

Figure 4:
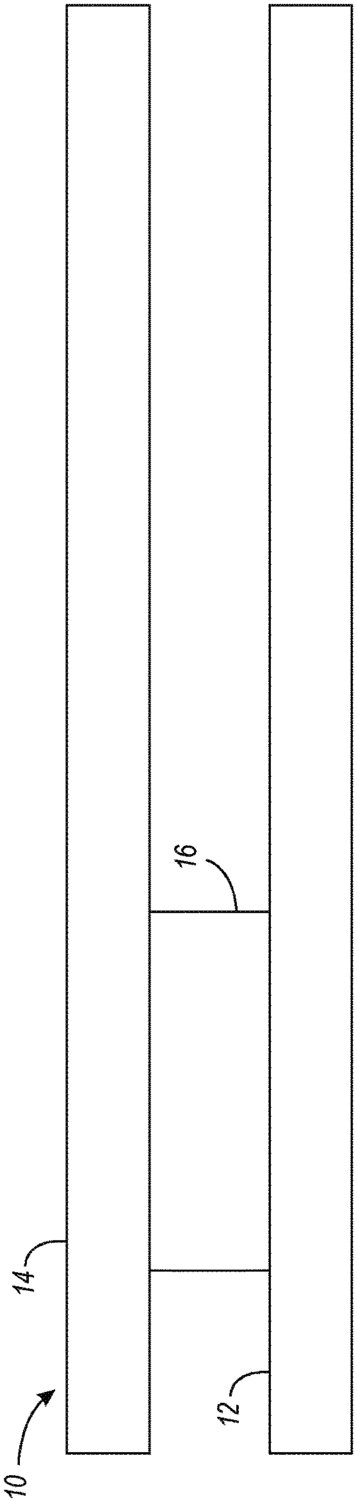
FIG. 4 is a top partial view of a fenestration frame assembly.
Figure 5:
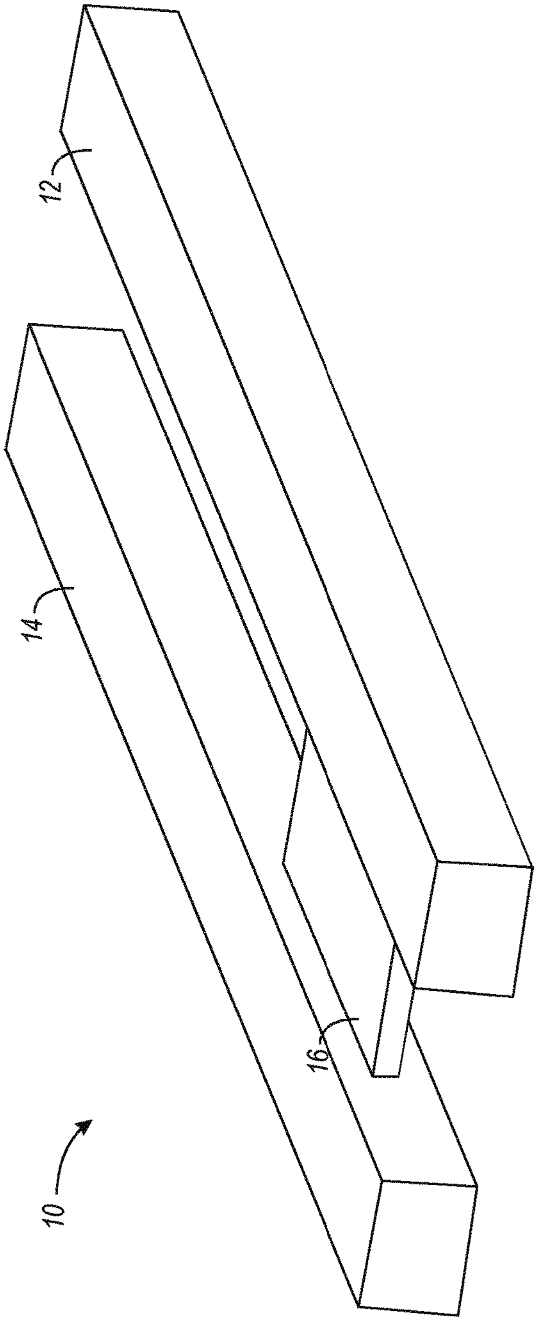
FIG. 5 is an isometric view of the partial fenestration frame assembly of FIG. 4.

FIGS. 4-5 illustrate a fenestration frame assembly that is similar to the fenestration frame assembly shown in FIGS. 1-3. FIG. 4 is a top partial view of the interior frame member 14, exterior frame member 12, and one bridge 16, according to embodiments. FIG. 5 shows a partial isometric view of the fenestration frame assembly 10 shown in FIG. 4. As can be seen, the bridges form thermal bridges between the two opposing surfaces (e.g., the interior frame member 12 and the exterior frame member 14 of the fenestration frame assembly 10). In some examples, the amount of thermal bridging is reduced to 7-8%, versus 100% if the frame members were joined along their entire lengths by steel. When comparing surface area of thermal bridging to the prior art, when an exemplary 12' section of material is built according to this disclosure (e.g., the fenestration frame assembly 10 shown in FIG. 1), the cross sectional area where bridges are made, can be configured to be 1.875 in^2, compared to 72 in^2 on a solid steel bar. This reduction in surface area reduces the amount of thermal transfer, and gives embodiments highly increased thermal performance. This includes a reduction in U-factor (the inverse of R-factor), and condensation resistance (CR). Both of these metrics are crucial as energy codes tighten, and homes are more tightly built.

Embodiments described herein can be fabricated in a number of fashions. This method of minimized bridging can be achieved by welding/brazing frame members together with bridges, machining the assemblies from solid stock, casting, forging, machining, stamping, cutting (e.g., via water jet), etc., for example. Particular embodiments may utilize a weldment of the interior and exterior components to bridges. Similarly, embodiments may also be manufactured from different materials, including, but not limited to, aluminum alloys, brass, steel, stainless steels, etc. It will be noted that embodiments may be especially useful when fabricated from metallic materials with a high rate of thermal conductivity.

In some embodiments, fenestration frame member stock can be manufactured using steel (e.g., stainless steel) members placed in a jig. The jig can be adapted to receive an interior frame member, an exterior frame member, and a plurality of bridges, as determined by a designer. Once placed in the jig, the materials are welded together to form a fenestration frame stock piece.

Fenestration systems disclosed herein can be manufactured in any desired manner. In some embodiments, stock fenestration frame assemblies can be manufactured in bulk, and then used when building fenestration systems. For example, multiple 12 foot fenestration frame assemblies, similar to that shown in FIG. 1, can be provided, and then used as needed during the manufacturing of fenestration systems. For example, a fenestration system manufacturer may design a plurality of fenestration systems using the same or similar stock fenestration frame assemblies, and simply treat the stock assemblies like any other building material.

As discussed above, the disclosed fenestration systems provide desired structural integrity, while also providing desired thermal properties. In the fenestration industry, simulations are commonly performed using software, such as a piece of FEA software called THERM. THERM models two-dimensional sectional views, calculates heat flows based on standard protocols, and then that data can be exported into a program called WINDOW. WINDOW can take the two-dimensional section views, with their calculated results, and calculate the performance of a completed window or door assembly.

Embodiments described herein have been validated using such software. FIGS. 6A, 6B, 7A, 7B, 8A, 8B, 9A and 9B depict these two-dimensional section views of fenestration system embodiments along with their respective heat flows. All of these views are shown with exterior conditions on the left of the figure and interior conditions on the right of the figure. The result views show how embodiments of a window section as disclosed herein performs under their standard conditions, for example: Exterior: 0 degrees F.; Interior: 70 degrees F.; and Wind Speed: 12.3 mph. FIGS. 6B, 7B, 8B, and 9B also show the surface condensation potential 21 as predicted by the THERM software.

Figure 6B:
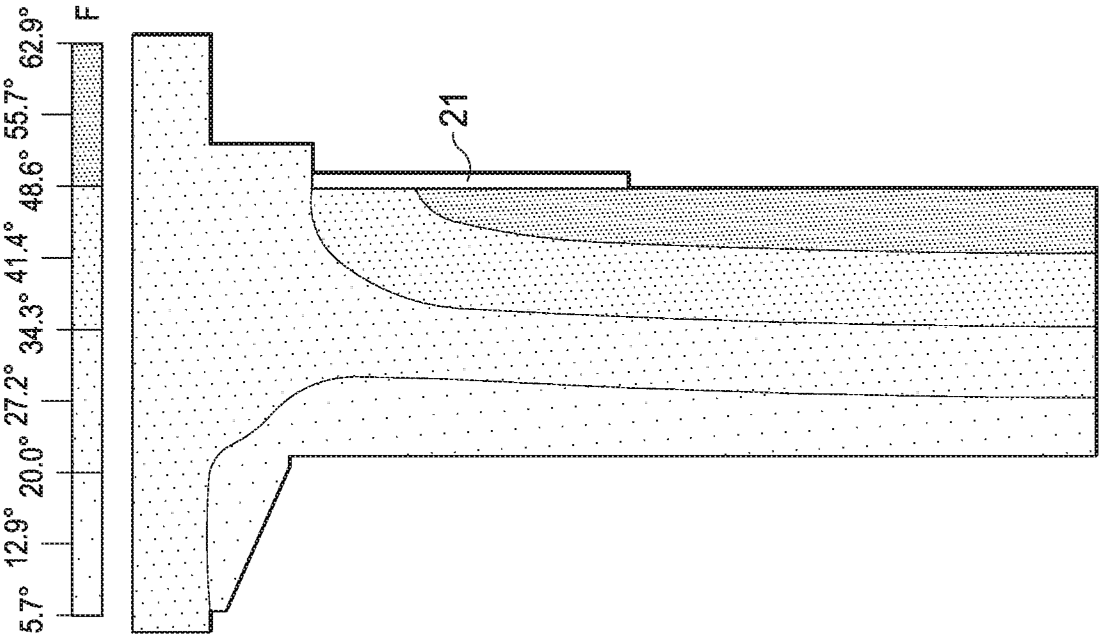
FIGS. 6A-7B are partial sectional views of a window utilizing a fenestration frame assembly illustrating heat transfer at a bridge and at an air gap.
Figure 6A:
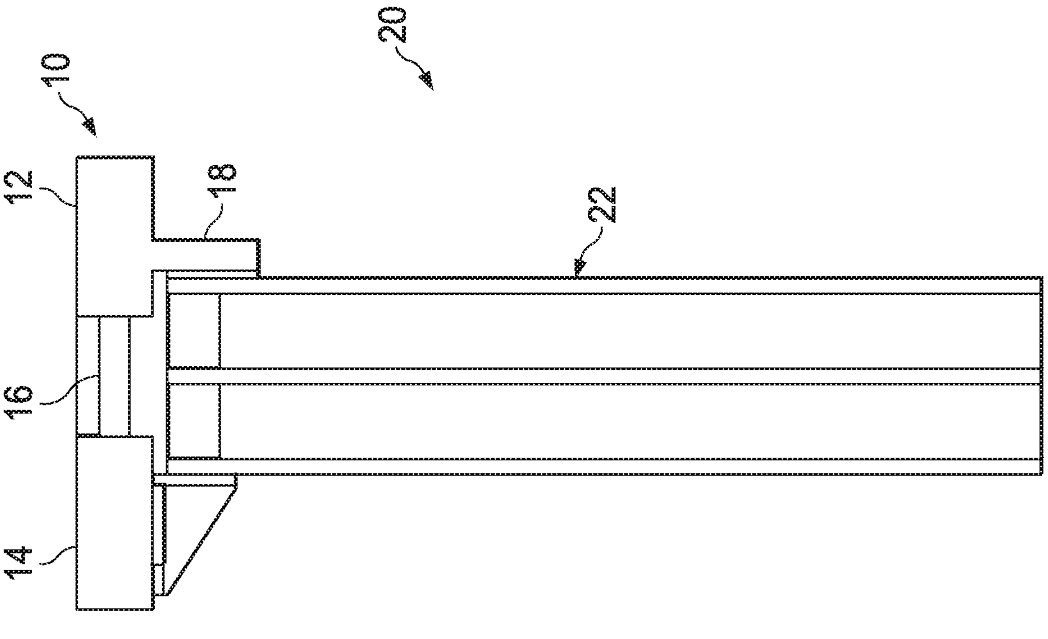

FIG. 6A is a (pre-calculation) partial sectional view of a window, with the section sliced at a bridge 16. FIG. 6A shows a fenestration system 20 (in this example, a triple pane window) that was manufactured using a fenestration frame assembly 10 around the periphery of the fenestration assembly 20. A triple pane insulated glass unit 22 comprises three panes of glass, a glazing cavity surface, an Argon fill, a cardinal stainless spacer, and other components, as one skilled in the art would understand. In this example, the bridges are 1½" long, spaced approximately 12" on center.

FIG. 6B depicts a post-calculation view of a frame profile (e.g., the frame profile shown in FIG. 6A). Like in FIG. 6A, this section is showing the frame sliced at the bridge. These bridges are 1½" long, spaced approximately 12" on center. FIG. 6B shows how temperature flows through the frame, and correlates with the included temperature legend (shown at the top portion of FIG. 6B). As shown, the bridge creates a complete thermal pathway from exterior to interior, and heat flows freely between the interior frame member to the exterior frame member. Note that software such as THERM can show temperatures changes at a higher resolution than that shown in FIGS. 6B, 7B, 8B, and 9B, but the figures are an accurate representation of relative temperatures differences, as one skilled in the art would understand.

Figure 7B:
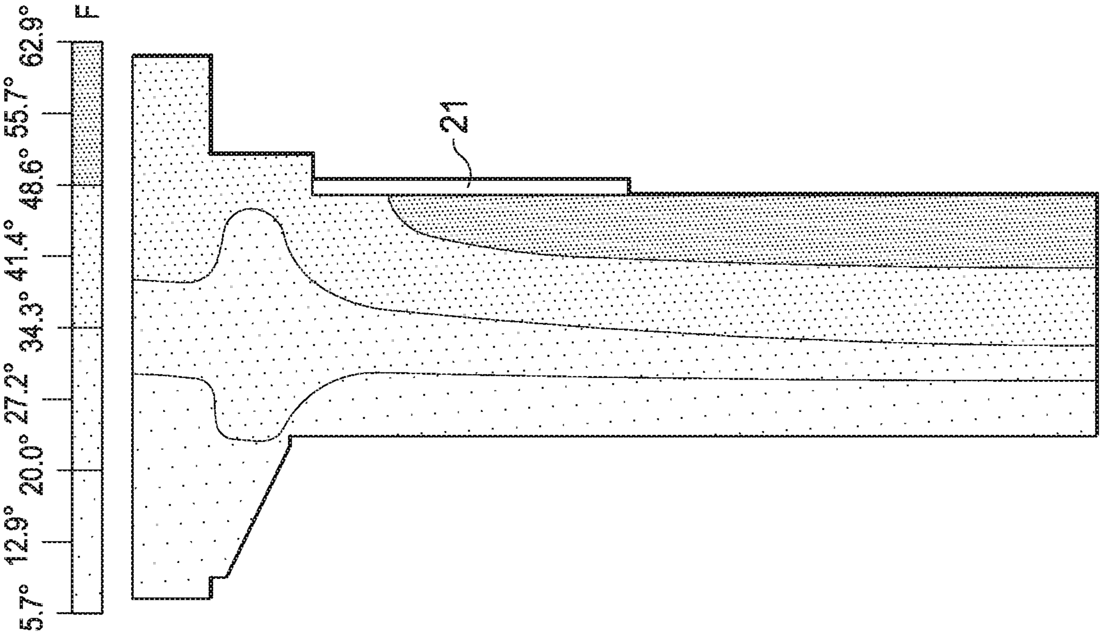
Figure 7A:
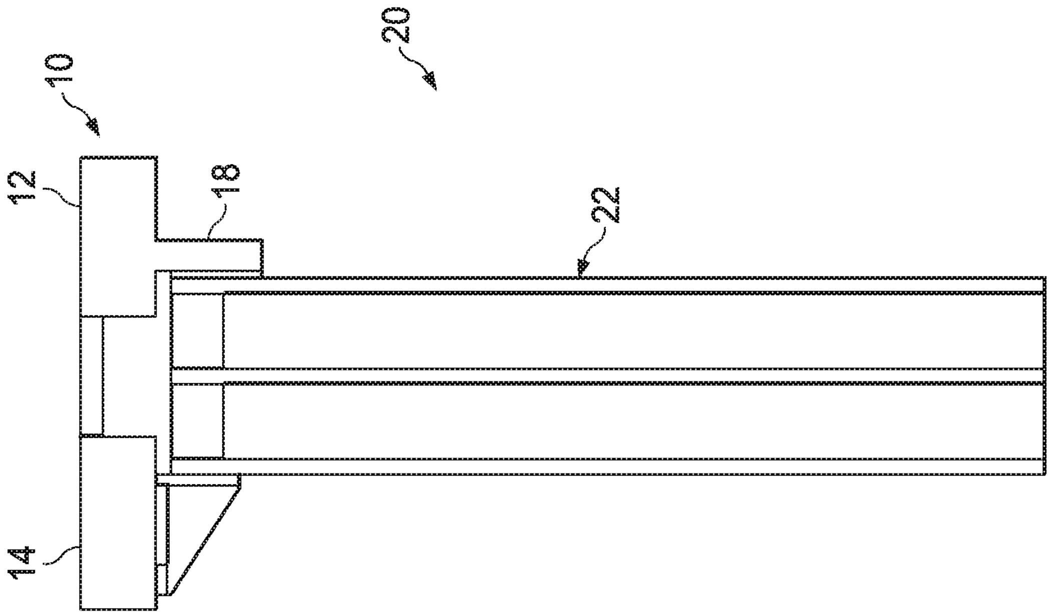

FIG. 7A is a (pre-calculation) partial sectional view of the window modeled in FIG. 6A, but sliced between bridges at the air gap between opposing frame members created by the bridges. This section occurs at approximately 90% of the overall frame perimeter. FIG. 7B depicts a post-calculation view of a frame profile (e.g., the frame profile shown in FIG. 7A). Like in FIG. 7A, this section is showing the frame sliced between bridges. FIG. 7B shows how temperature flows through the frame, and correlates with the included temperature legend (shown at the top portion of FIG. 7B). As shown, the air gap maintains the exterior and interior separation, stopping heat flows from interior to exterior. The interior of the assembly will be significantly closer to ambient room temperature, rather than colder exterior temperatures.

Figure 8B:
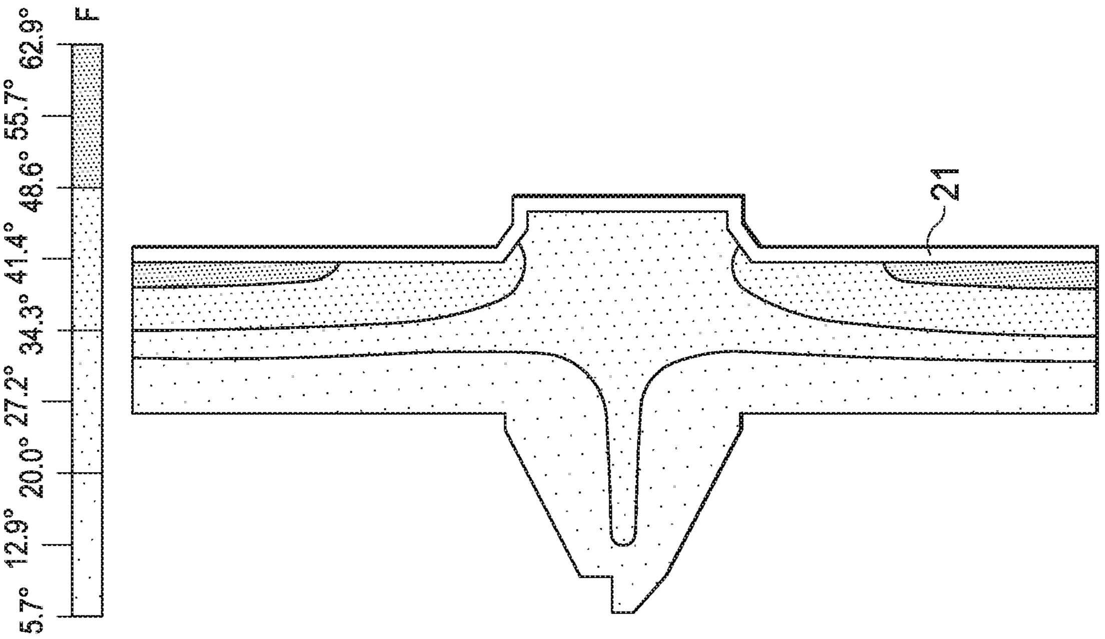
FIGS. 8A-9B are partial sectional views of a window utilizing a fenestration divider assembly illustrating heat transfer at a bridge and at an air gap.
Figure 8A:
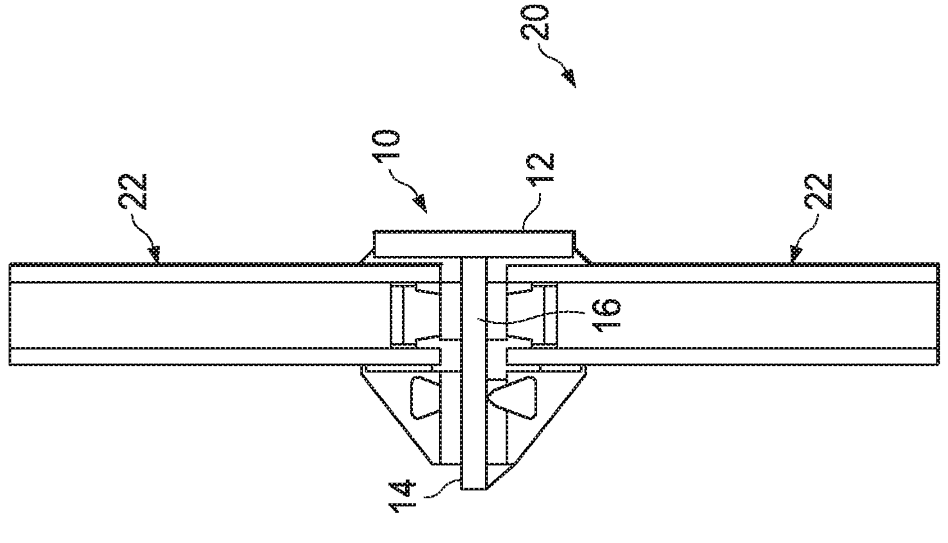

FIGS. 8A, 8B, 9A, and 9B are similar to FIGS. 6A, 6B, 7A, and 7B, but showing a different type of fenestration component. FIG. 8A depicts one embodiment of a muntin/glass divider used on a window (e.g., see FIGS. 16-18). In this embodiment, a T-bar (muntin/glass divider) is formed by an interior frame member 12 and an exterior frame member 14. As described above, bridges 16 join the interior frame member 12 and exterior frame member 14, and provide a thermal break between the members. FIG. 8A is showing the muntin/glass divider at a solid section (sectioned through a bridge 16), with a complete thermal bridge between the exterior and interior members 12 and 14. In this example, these solid sections are 1½" long, and spaced between 14-16" on center. FIG. 8B depicts the post-calculation view of the muntin/glass divider depicted in FIG. 8A. FIG. 8B shows how temperature flows through the frame, and correlates with the included temperature legend. The bridge creates a complete thermal pathway from exterior to interior, and heat flows freely between the interior frame member to the exterior frame member.

Figure 9B:
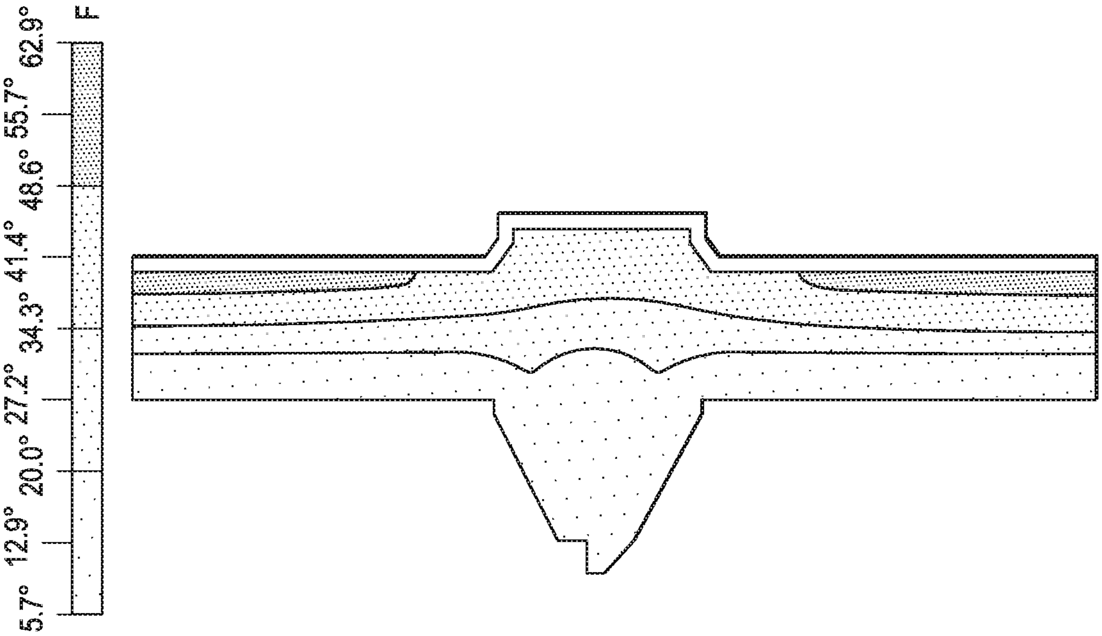
Figure 9A:
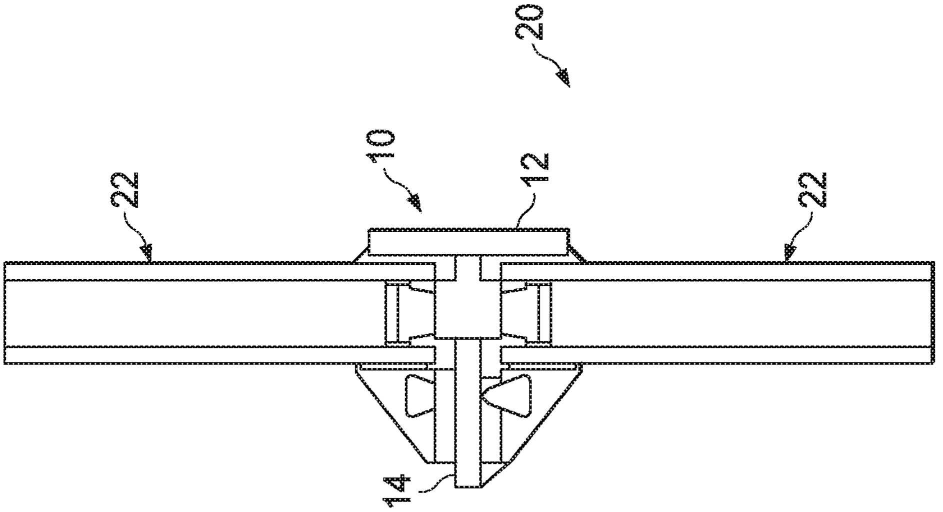

FIG. 9A is a (pre-calculation) partial sectional view of one embodiment of the muntin/glass divider modeled in FIG. 8A, but sliced between bridges at an air gap between opposing frame members created by the bridges. This section is therefore showing the muntin/glass divider at an air gap section, with a complete thermal break between the exterior and interior members 12 and 14. In some examples, these air gaps range from 12-14" long. FIG. 9B depicts a post-calculation view of an embodiment of the muntin/glass divider (e.g., similar to that as depicted in FIG. 9A) at the air gap. As illustrated in FIG. 9B, at the air gap, the heat flows are stopped, with exterior and interior conditions maintained.

FIGS. 10-34 illustrate various embodiments of fenestration systems and fenestration system components utilizing the teachings of the present disclosure. Numerous other examples are also possible, as one skilled in the art would understand.

Figure 10:
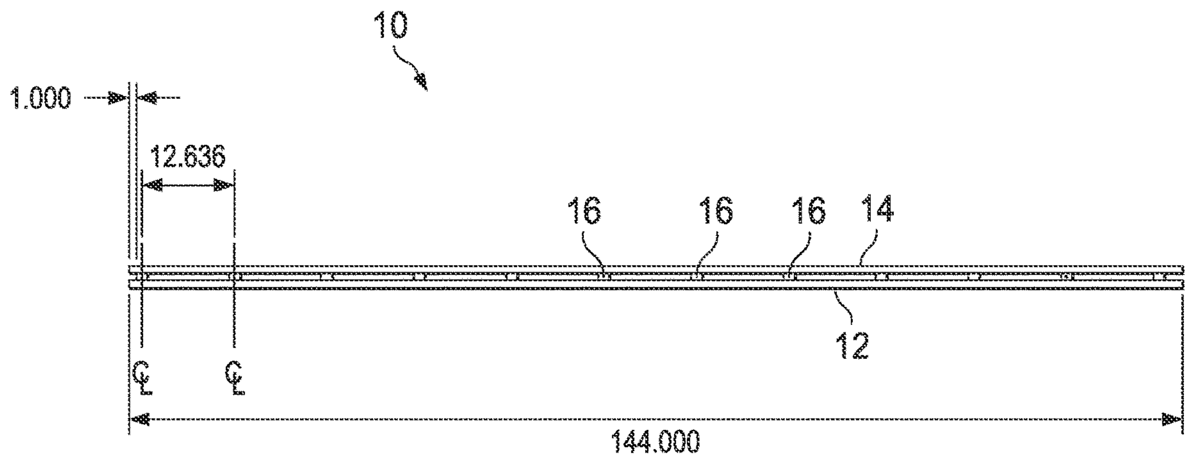
FIG. 10 is a top view of a fenestration frame assembly.

FIG. 10 is a top view of a fenestration frame assembly 10 comprising an interior fenestration member 12 and an exterior fenestration member 14. In the example shown in FIG. 10, the fenestration frame assembly 10 is a 12 foot stock frame member that can be used to manufacture numerous types of fenestration systems. In the example shown, a plurality of bridges 16 are coupled to the interior and exterior frame members 12 and 14 to provide strength to the fenestration frame assembly 10, while also providing a thermal break between the interior and exterior fenestration members.

Figure 11:
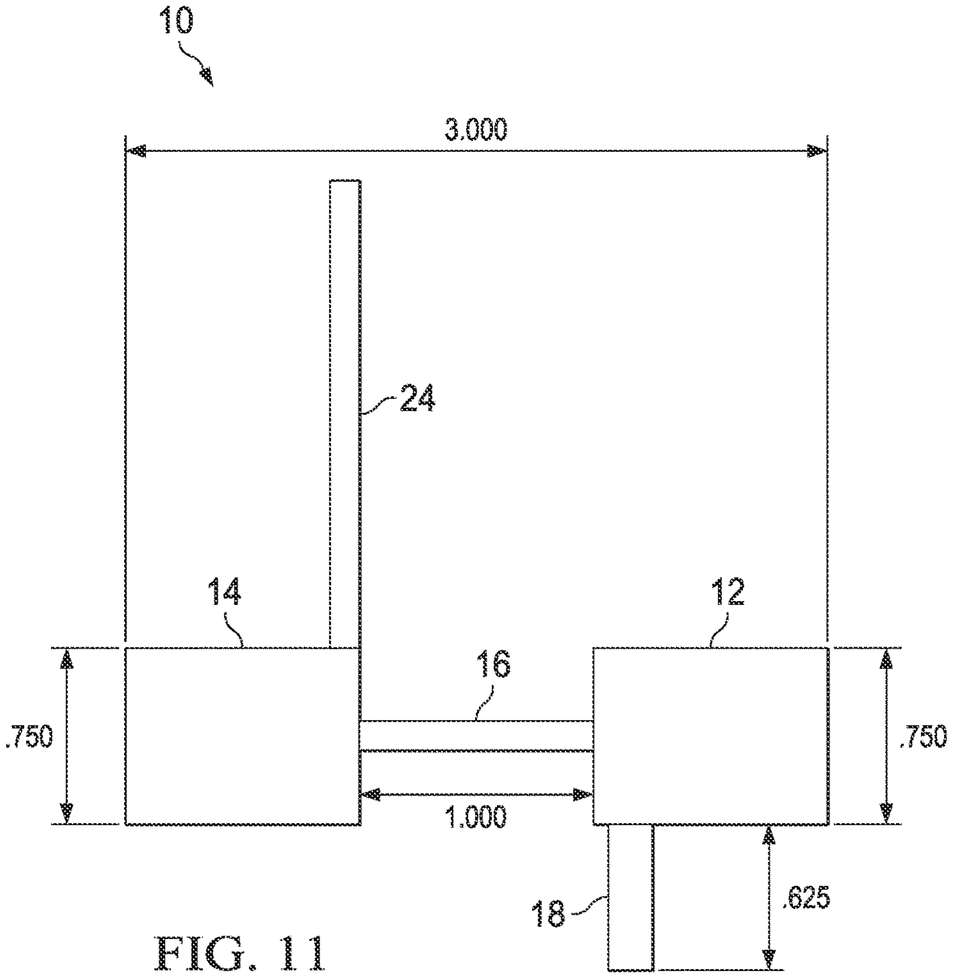
FIG. 11 is a sectional view of a fenestration frame assembly used for a fixed window.

FIG. 11 is a sectional view of a fenestration frame assembly 10, such as that shown in FIG. 10. In this example, the sectional view of FIG. 11 shows the fenestration frame assembly 10 configured to be used with a fixed window. As shown, the section is taken through one of the bridges 16. In this example, the interior frame member 12 is separated by the exterior frame member 14 by the bridges 16. A glazing stop 18 is also coupled to the interior frame member 12. A nailing flange 24 is coupled to the exterior frame member 14. Over most of the length of the fenestration frame assembly 10, the interior and exterior members are separated by an air gap. However, enough bridges 16 are provided such that the assembled fenestration frame assembly 10 has suitable structural rigidity to be used to manufacture fenestration systems.

Figure 12:
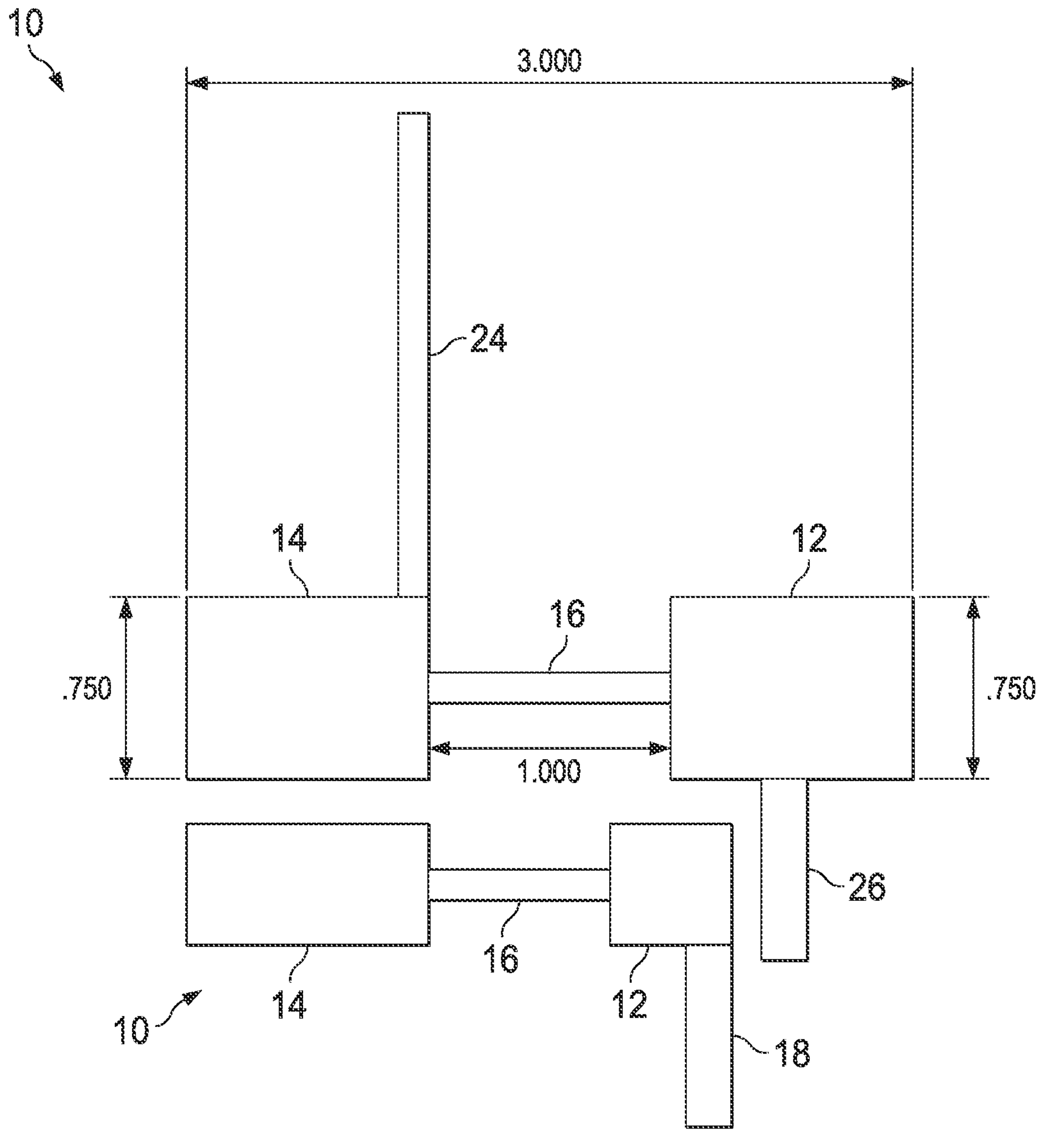
FIG. 12 is a sectional view of two fenestration frame assemblies used with an outswing door.

FIG. 12 shows two fenestration frame assemblies 10, such as that shown in FIG. 10. In this example, the sectional view of FIG. 12 shows the fenestration frame assemblies 10 configured to be used with an outswing door. As shown, the section is taken through one of the bridges 16 in each fenestration frame assembly 10. In this example, a first fenestration frame assembly 10 is used with a door frame, and includes a nailing flange 24 and a door stop 26. A second fenestration frame assembly 10 is used with a door, and includes a glazing stop 18. As before, over most of the length of the fenestration frame assemblies 10, the interior and exterior members are separated by an air gap. However, enough bridges 16 are provided such that the assembled fenestration frame assemblies 10 have suitable structural rigidity to be used to manufacture fenestration systems.

Figure 13:
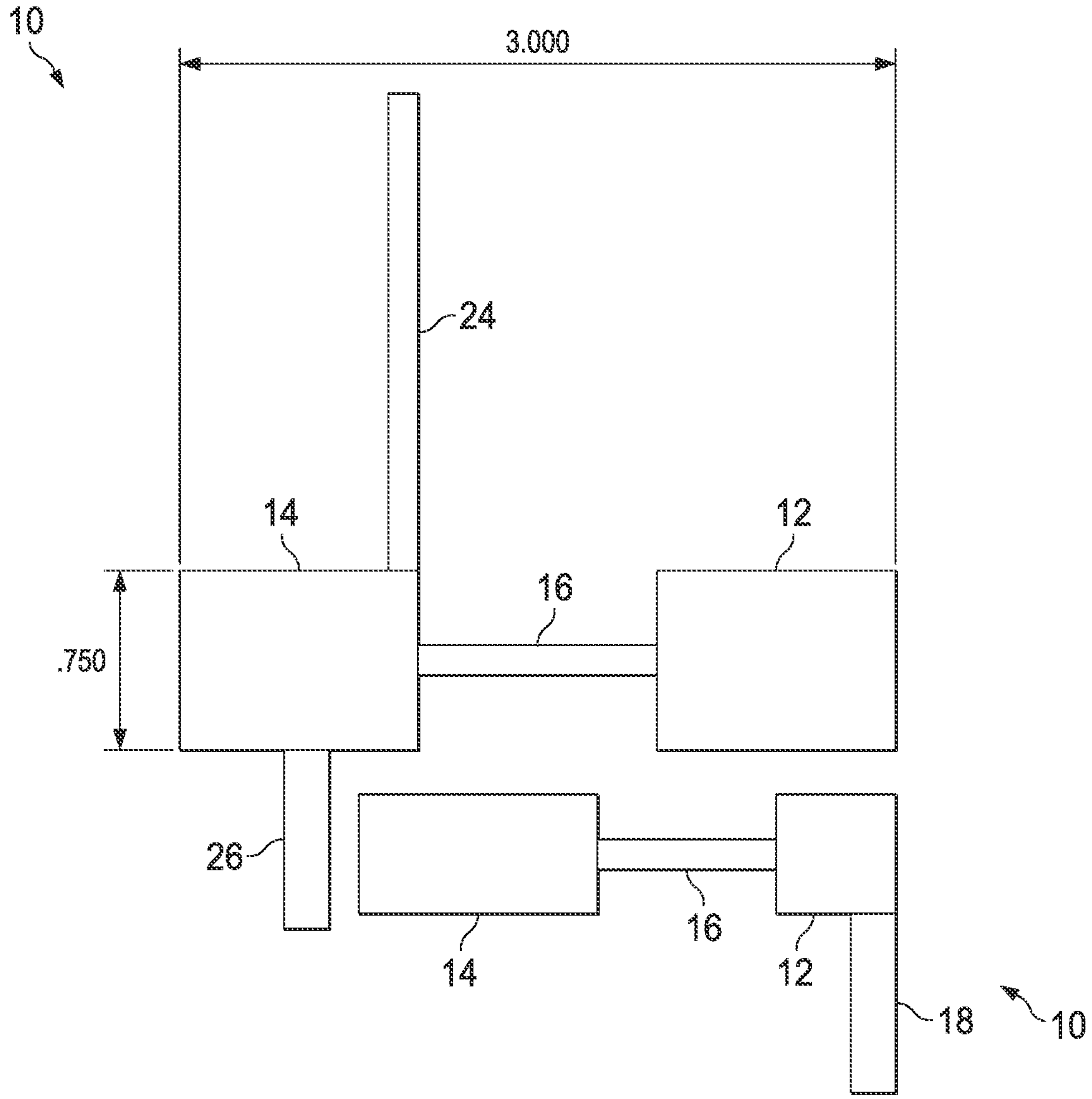
FIG. 13 is a sectional view of two fenestration frame assemblies used with an inswing door.

FIG. 13 shows two fenestration frame assemblies 10, such as that shown in FIG. 10. In this example, the sectional view of FIG. 13 shows the fenestration frame assemblies 10 configured to be used with an inswing door. As shown, the section is taken through one of the bridges 16 in each fenestration frame assembly 10. In this example, a first fenestration frame assembly 10 is used with a door frame, and includes a nailing flange 24 and a door stop 26. A second fenestration frame assembly 10 is used with a door, and includes a glazing stop 18. As before, over most of the length of the fenestration frame assemblies 10, the interior and exterior members are separated by an air gap. However, enough bridges 16 are provided such that the assembled fenestration frame assemblies 10 have suitable structural rigidity to be used to manufacture fenestration systems.

Figure 14:
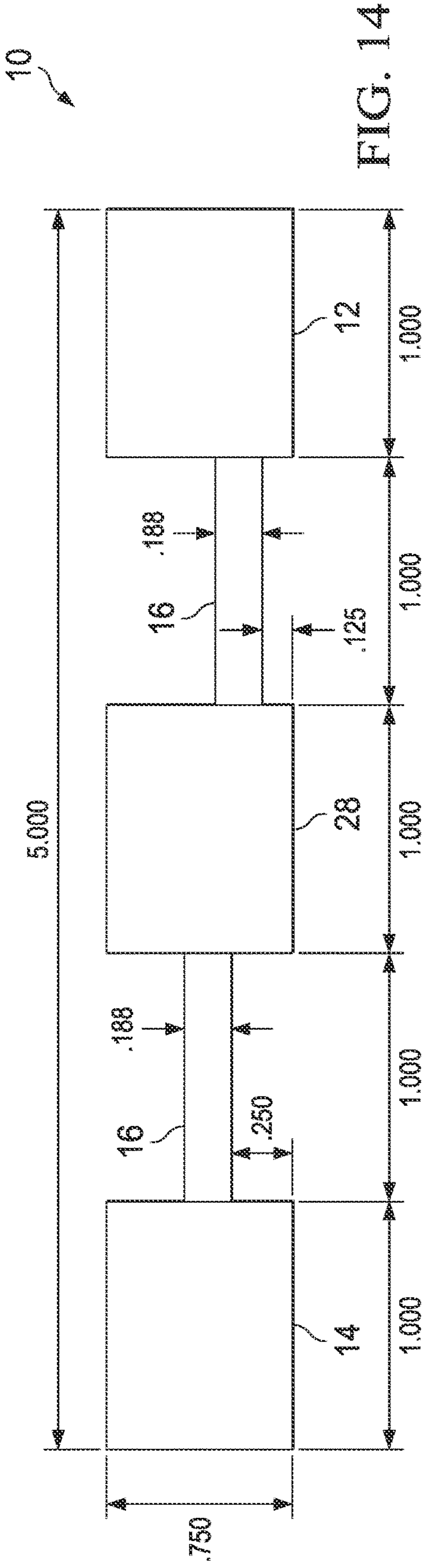
FIG. 14 is a sectional view of an embodiment of a fenestration frame assembly utilizing three frame members.

FIG. 14 is a sectional view of a fenestration frame assembly 10, having an intermediate fenestration frame assembly. In this example, the fenestration frame assembly 10 has an interior frame member 12, and exterior frame member 14, and an intermediate frame member 28 disposed between the interior frame member 12 and exterior frame member 14. As before, bridges 16 are coupled between frame members to provide structural support and a thermal break. The embodiment shown in FIG. 14 provides a relatively wide fenestration frame assembly 10 (for example, 5 inches), while maintaining strength and thermal isolation.

Figure 15:
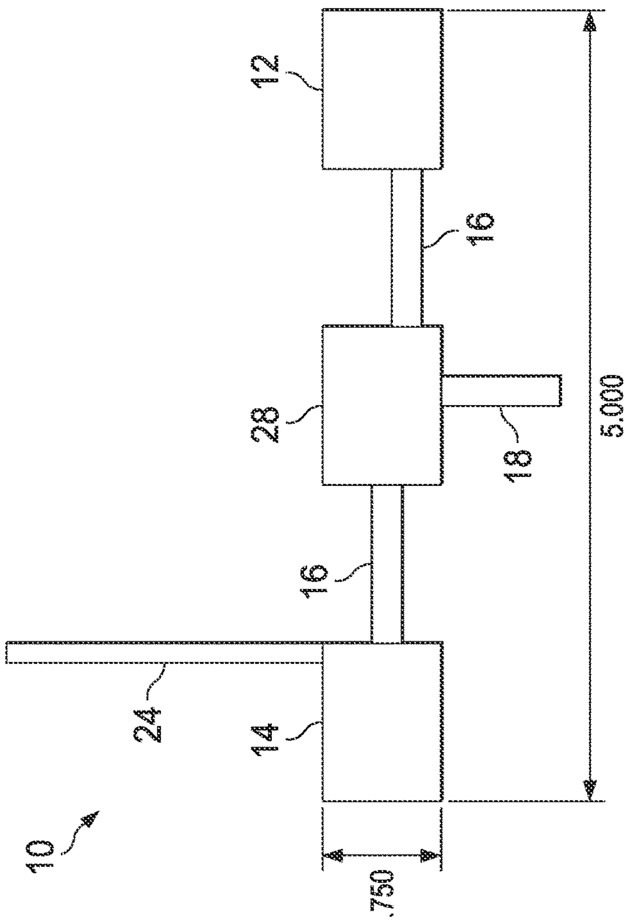
FIG. 15 is a sectional view of a fenestration frame assembly used with a fixed window.

FIG. 15 is a sectional view of a fenestration frame assembly 10, such as that shown in FIG. 14. In this example, the sectional view of FIG. 15 shows the fenestration frame assembly 10 configured to be used with a fixed window. As shown, the section is taken through one of the bridges 16 between each frame member coupling. Note that the bridges between frame members 14 and 28 do not have to align with bridges between frame members 28 and 12. In fact, staggering the bridges (i.e., not aligning the bridges) may provide improved thermal isolation, since the path from the interior to the exterior through the bridges will be longer. In this example, a glazing stop 18 is coupled to the intermediate frame member 28. A nailing flange 24 is coupled to the exterior frame member 14. Over most of the length of the fenestration frame assembly 10, the interior and exterior members are separated by two air gaps. However, enough bridges 16 are provided such that the assembled fenestration frame assembly 10 has suitable structural rigidity to be used to manufacture fenestration systems.

Figure 16:
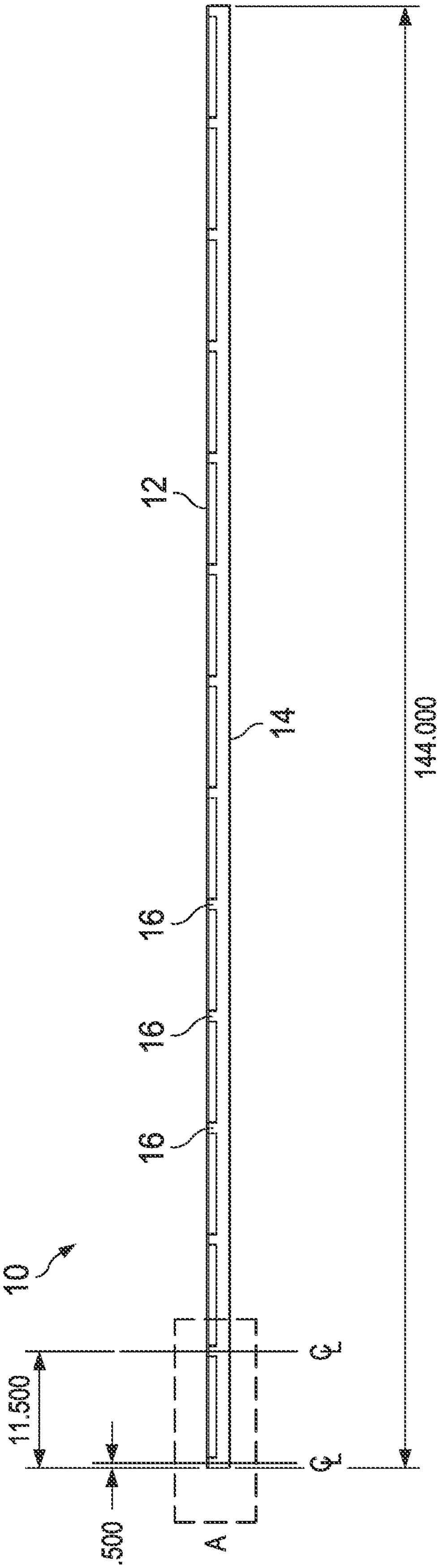
FIG. 16 is a top view of a fenestration frame assembly used with a muntin assembly of a window.
Figure 17:
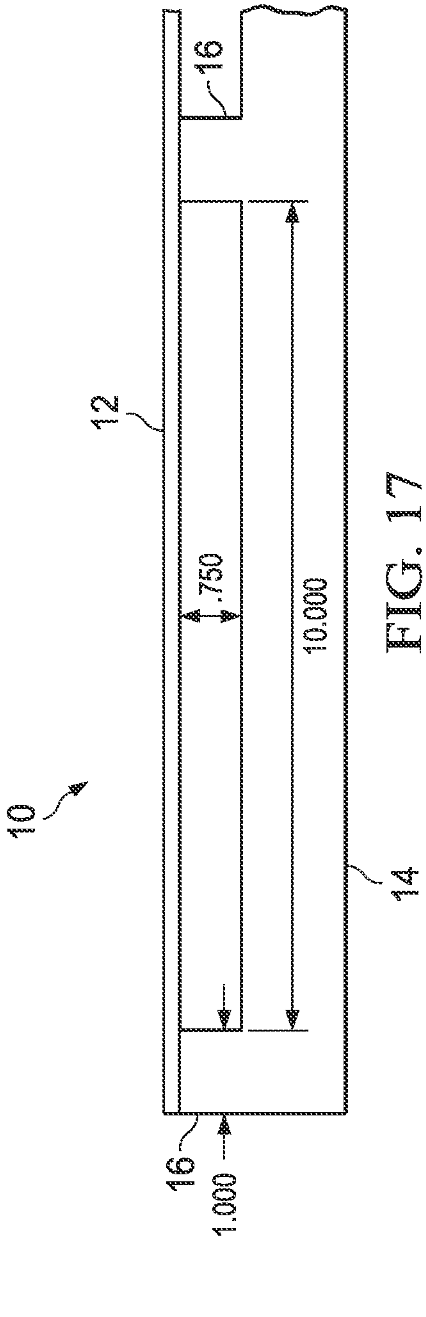
FIG. 17 is an enlarged partial view of the fenestration frame assembly shown in FIG. 16.

FIG. 16 is a top view of a fenestration frame assembly 10 configured as a muntin/glass divider used on a window. FIG. 17 is an enlarged partial view of the fenestration frame assembly 10 shown in FIG. 16. In this embodiment, a T-bar (muntin/glass divider) is formed by an interior frame member 12 and an exterior frame member 14. As described above, bridges 16 join the interior frame member 12 and exterior frame member 14, and provide a thermal break between the members. In the example shown in FIG. 16, the fenestration frame assembly 10 is a 12 foot stock frame member that can be pre-made used to manufacture numerous types of muntin fenestration assemblies. In the example shown, a plurality of bridges 16 are coupled to the interior and exterior frame members 12 and 14 to provide strength to the fenestration frame assembly 10, while also providing a thermal break between the interior and exterior fenestration members.

Figure 18:
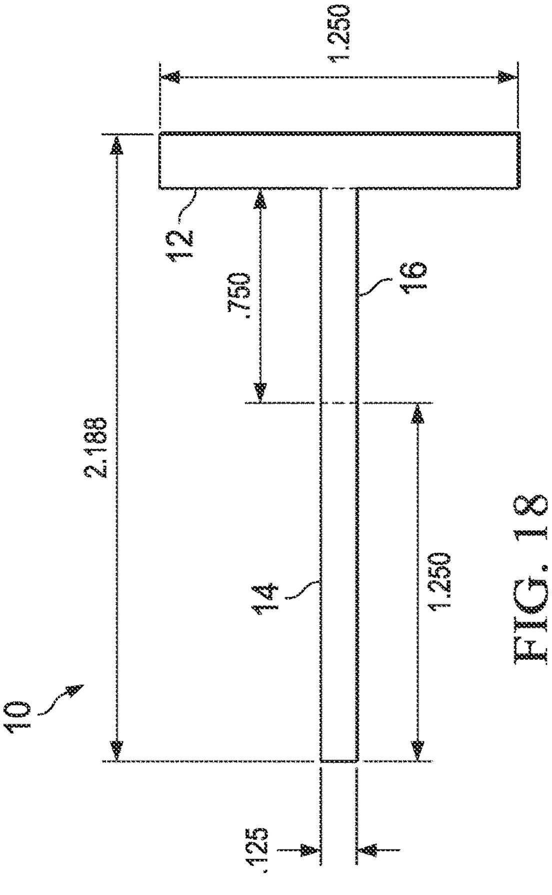
FIG. 18 is an end view of the fenestration frame assembly shown in FIG. 16.

FIG. 18 is an end view of a fenestration frame assembly 10, such as that shown in FIGS. 16 and 17. In this example, the interior frame member 12 is separated by the exterior frame member 14 by the bridges 16. Over most of the length of the fenestration frame assembly 10, the interior and exterior members are separated by an air gap (the edges of which are shown by the hidden (dashed) line. However, enough bridges 16 are provided such that the assembled fenestration frame assembly 10 has suitable structural rigidity to be used to manufacture fenestration systems.

Figure 19:
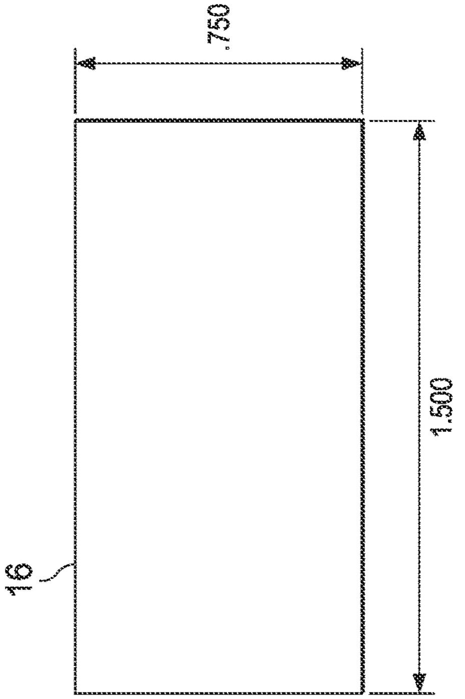
FIGS. 19-21 show embodiments of bridges used with fenestration frame assemblies.
Figure 21:
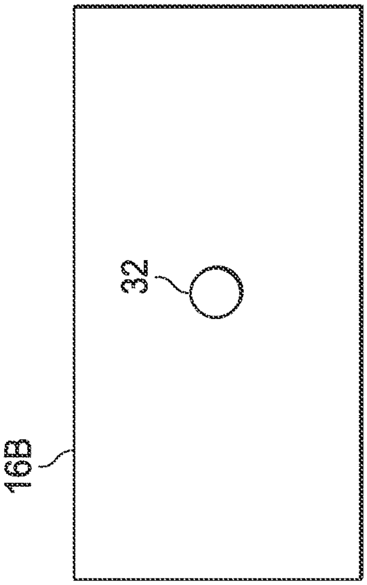
Figure 20:
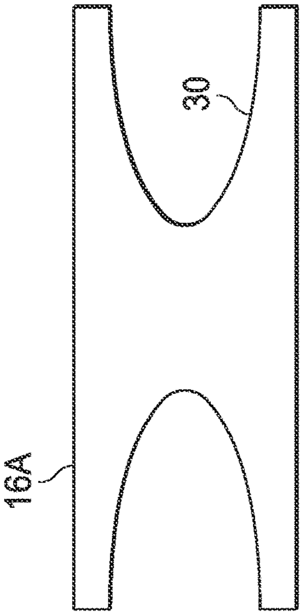

FIGS. 19-21 show embodiments of bridges used with fenestration frame assemblies. FIG. 19 shows a rectangular bridge 16. A rectangular bridge provides a good combination of strength, thermal isolation, and ease of manufacture. FIG. 20 shows a bridge 16A that has wide ends that couple to the frame members for strength. The bridge 16A has cut-outs 30 that gives the middle section a smaller cross section, increasing its thermal isolation properties. FIG. 21 shows a bridge 16B that has a hole 32 formed through the bridge. In some applications, it may be desirable to provide a way to secure (e.g., via a self-tapping screw through the hole, etc.) the fenestration assembly to the framing of the building upon installation.

Figure 22:
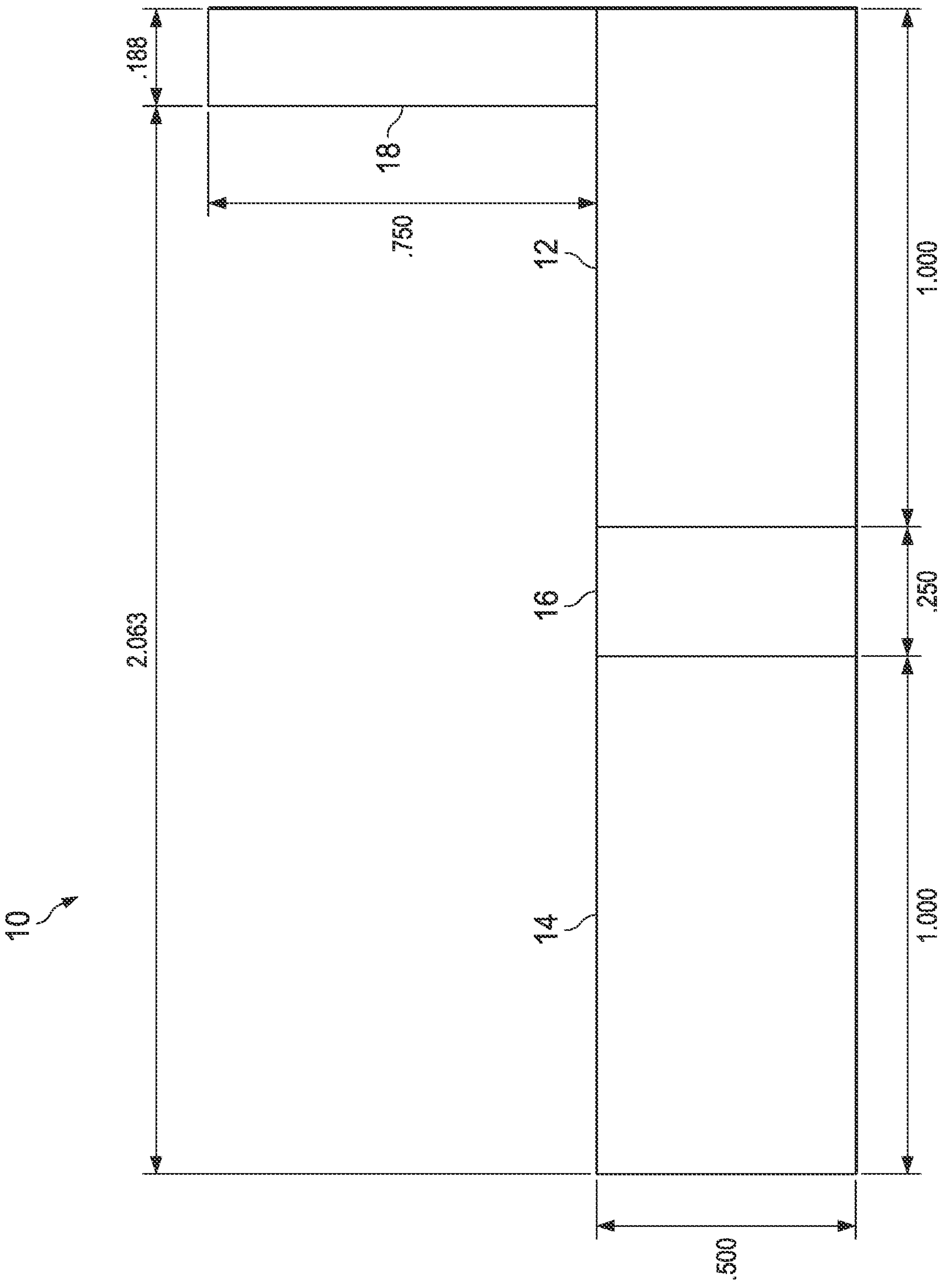
FIG. 22 shows a cross-sectional view of an embodiment of a fenestration frame assembly.

FIG. 22 is a sectional view of a fenestration frame assembly 10 having an interior frame member 12, an exterior frame member 14, and bridges 16 coupled between frame members to provide structural support and a thermal break. The embodiment shown in FIG. 22 provides a relatively small gap between the interior frame member 12 and exterior frame member 14. As before, the bridges 16 provide structural rigidity and thermal isolation.

Figure 23:
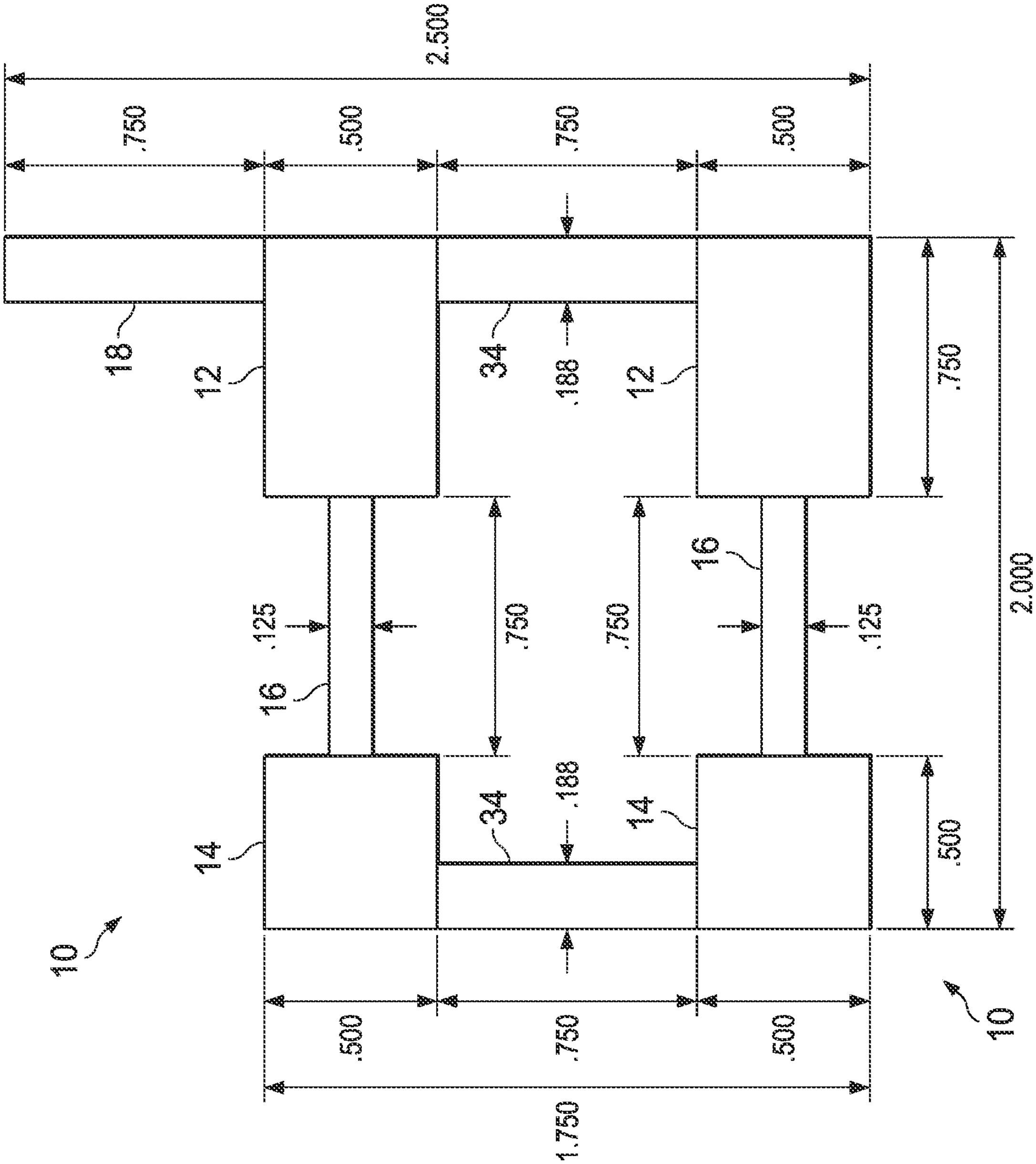
FIG. 23 shows a cross-sectional view of an embodiment of a fenestration frame assembly.

FIG. 23 is a sectional view of an assembly having two fenestration frame assemblies 10. In this example, a first fenestration frame assembly 10 has an interior frame member 12, exterior frame member 14, and a glazing stop 18 coupled to the interior frame member 12. As described above bridges 16 are coupled between the interior frame member 12 and the exterior frame member 14 of the first fenestration frame assembly 10. A second fenestration frame assembly 10 has an interior frame member 12 and an exterior frame member 14. As with the first fenestration frame assembly 10, the second fenestration frame assembly 10 has bridges 16 coupled between the interior frame member 12 and the exterior frame member 14 of the first fenestration frame assembly 10. A first continuous coupling member 34 couples the two interior frame members 12 together, as shown. Similarly, a second continuous coupling member 34 couples the two exterior frame members 14 together, as shown.

Figure 25:
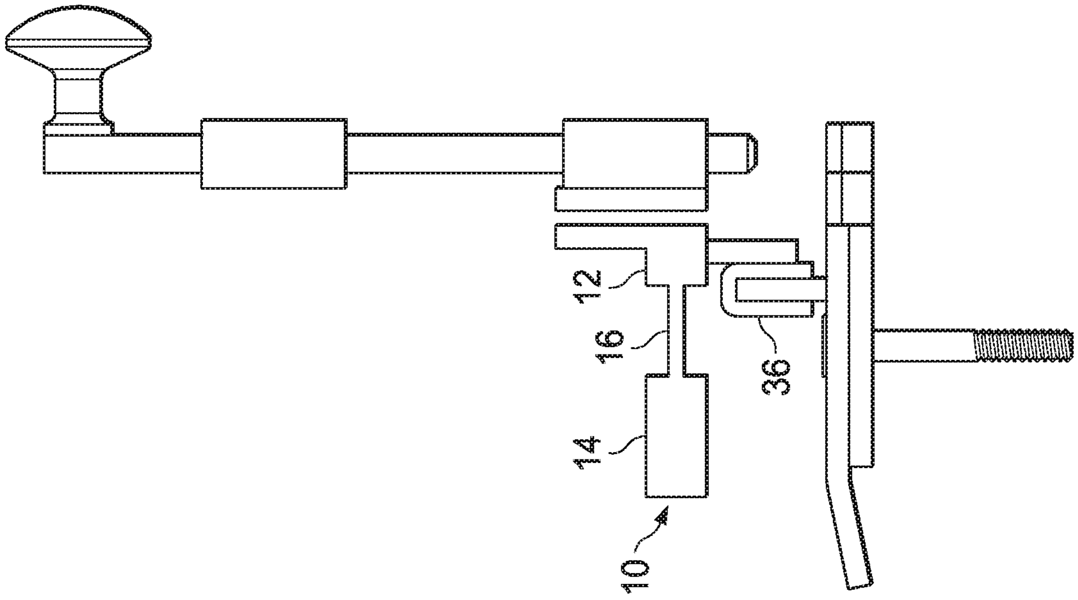
FIGS. 24-27 show fenestration frame assemblies used with various styles of doors.
Figure 24:
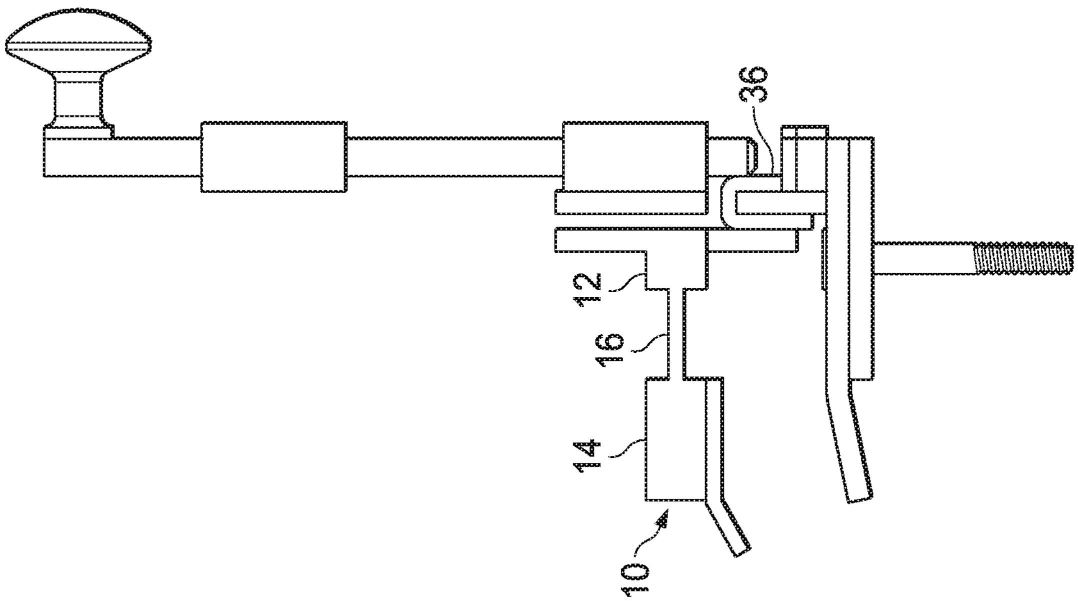
Figure 27:
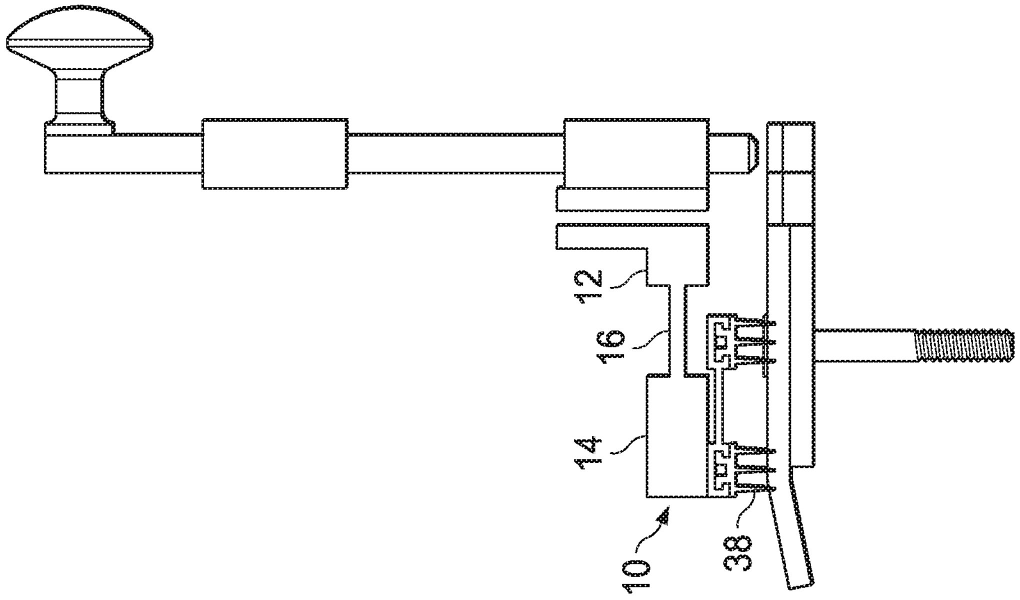
Figure 26:
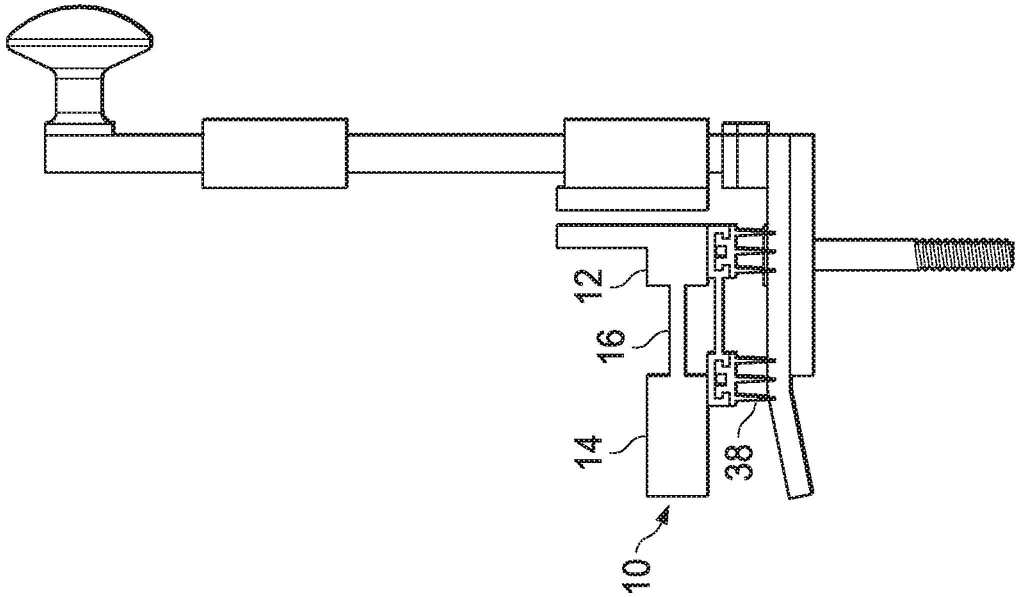

FIGS. 24-27 are sectional views showing fenestration frame assemblies used with various styles of doors. FIG. 24 shows a standard outswing style door. FIG. 25 shows a standard inswing style door. FIG. 26 shows a low profile outswing style door. FIG. 27 shows a low profile inswing style door. In each of the examples shown in FIGS. 25-27, a fenestration frame assembly 10 for the respective door comprises an interior frame member 12 and an exterior frame member 14 and bridges 16 coupled between them to provide strength and a thermal break. The standard threshold styles shown in FIGS. 24 and 25 include a backdam 36 (with cover). The low profile threshold styles shown in FIGS. 26 and 27 do not have a backdam, but have a triple fin sweep 38.

Figure 28:
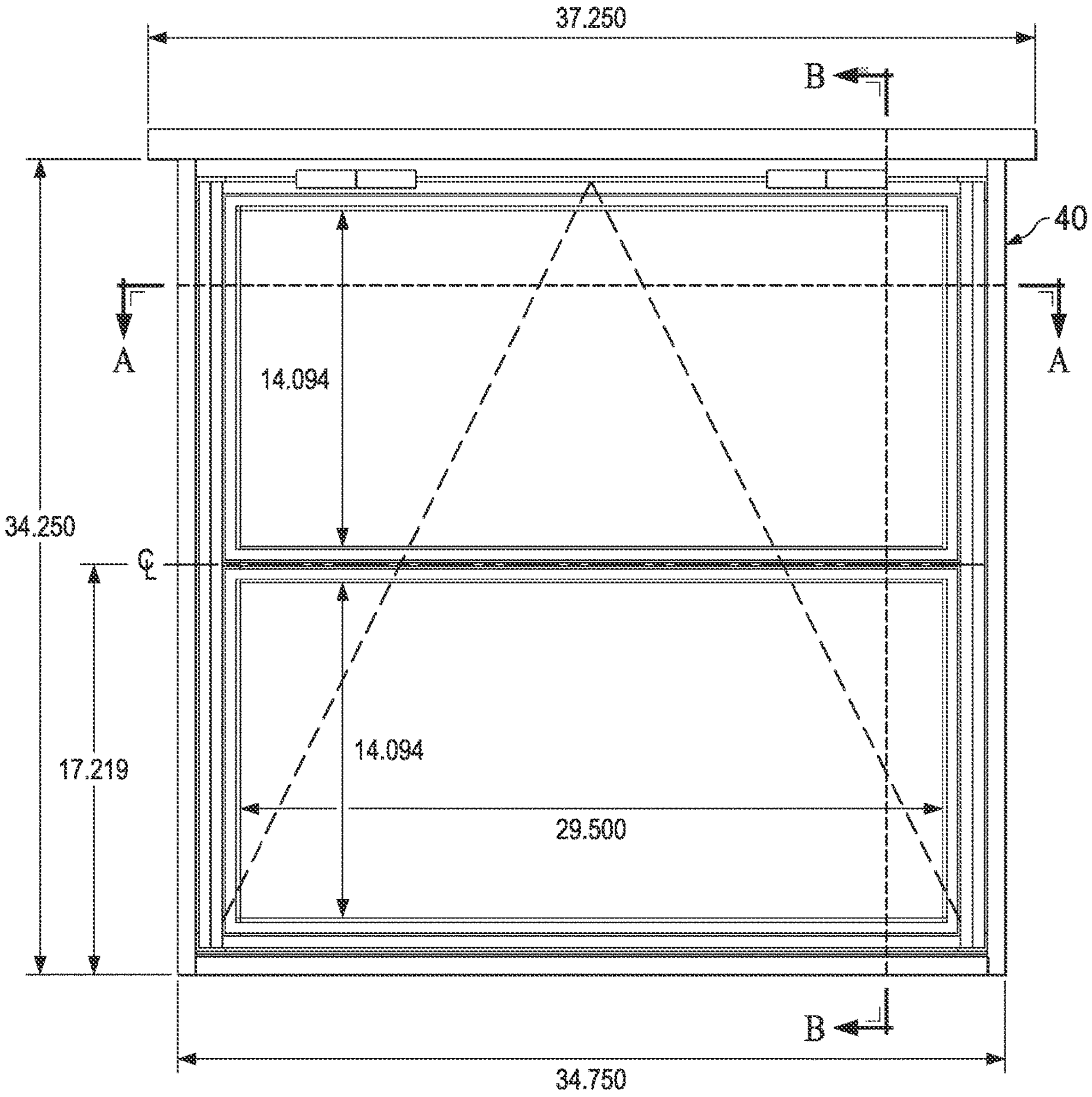
FIG. 28 is a front view of an awning window assembled using fenestration frame assemblies.
Figure 29:
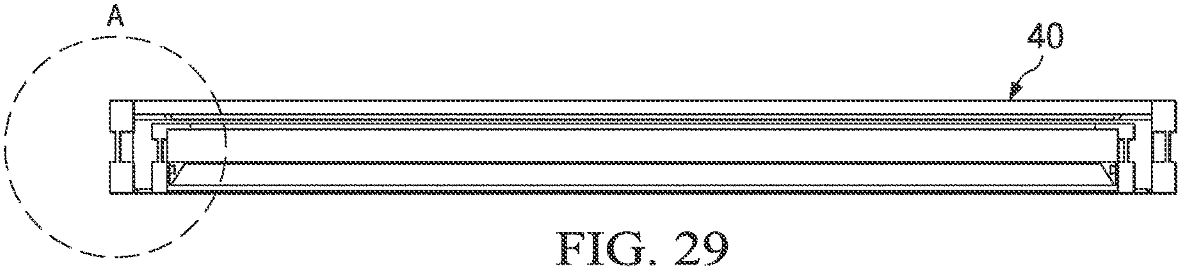
FIG. 29 is a sectional view taken along line A-A of FIG. 28.
Figure 30:
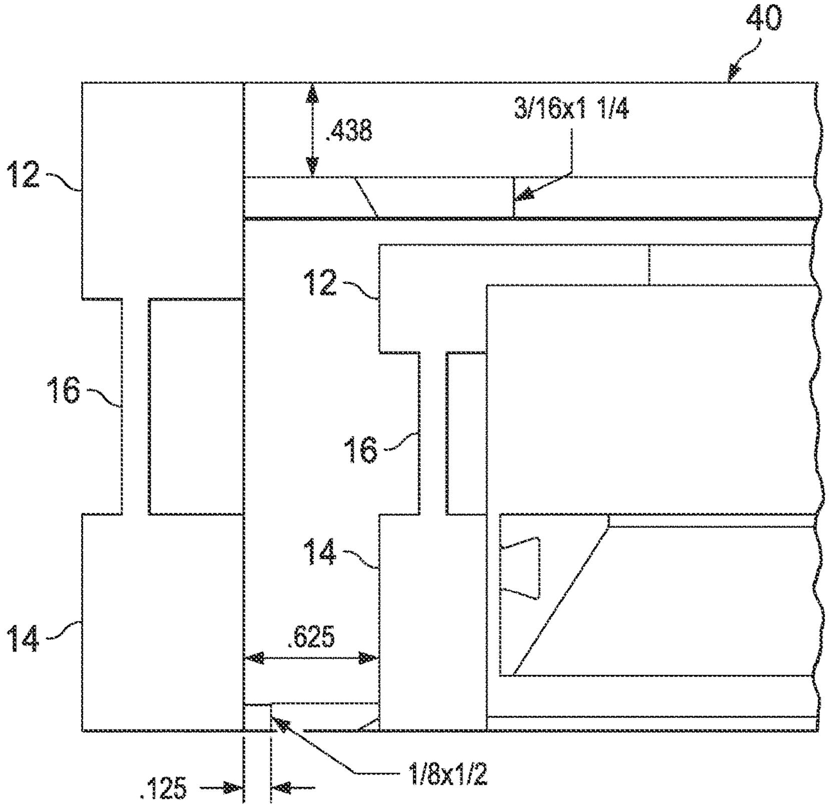
FIG. 30 is an enlarged partial view of FIG. 29.

FIGS. 28-30 are views showing an exemplary fenestration assembly (in this example, an awning window) constructed using the fenestration systems described above. FIG. 28 is a front view of an awning window 40 assembled using fenestration frame assemblies, such as those described above. FIG. 29 is a sectional view taken along line A-A of FIG. 28. FIG. 30 is an enlarged partial view of FIG. 29, showing two fenestration frame assemblies 10. As shown best in FIG. 30, a first outer fenestration frame assembly comprises an interior frame member 12, an exterior frame member 14, and a plurality of bridges 16 coupled to the interior and exterior frame members 12 and 14 to provide strength to the outer fenestration frame assembly, while also providing a thermal break between the interior and exterior fenestration members. Similarly, a second inner fenestration frame assembly comprises an interior frame member 12, an exterior frame member 14, and a plurality of bridges 16 coupled to the interior and exterior frame members 12 and 14 to provide strength to the inner fenestration frame assembly, while also providing a thermal break between the interior and exterior fenestration members.

Figure 31:
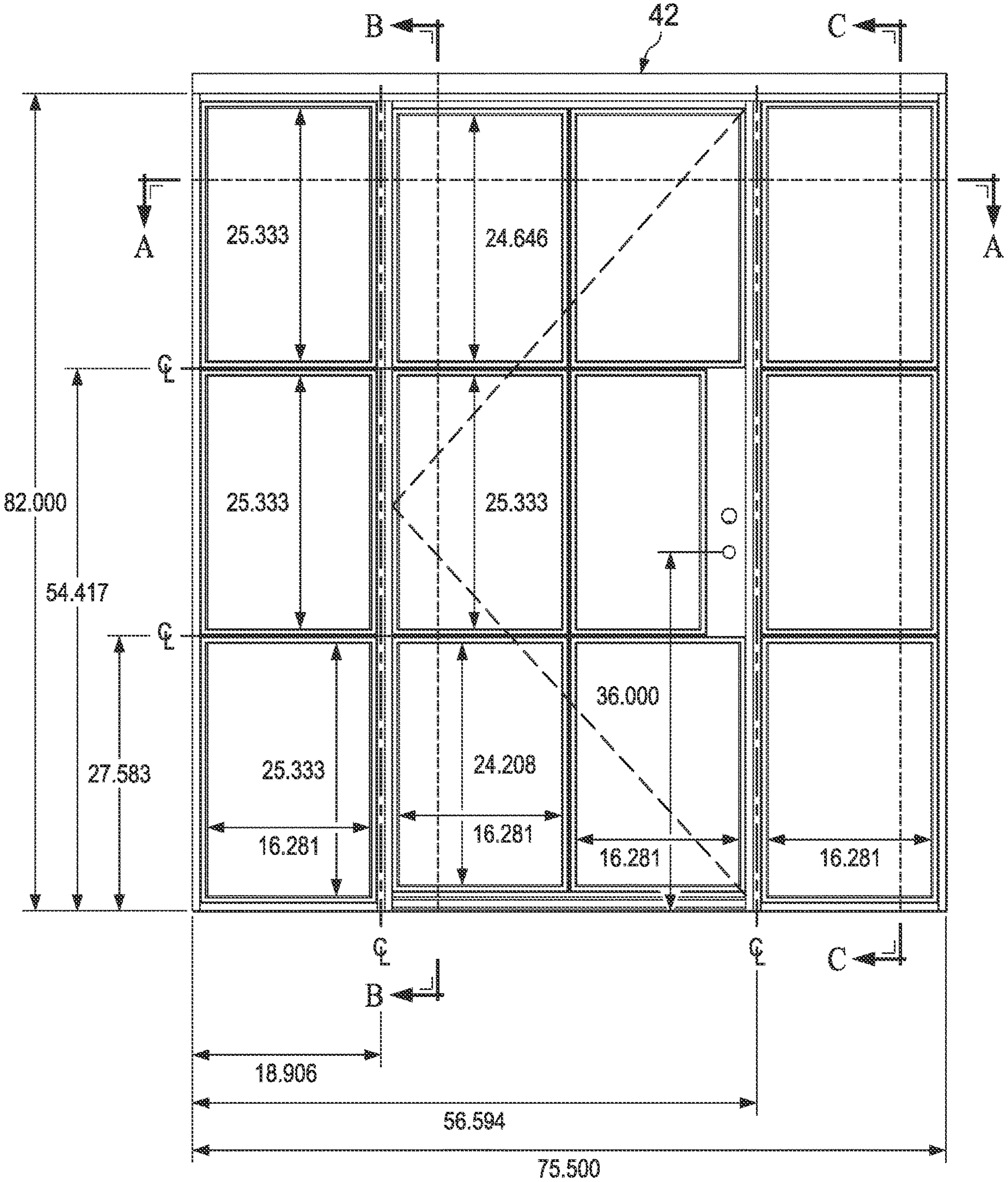
FIG. 31 is a front view of a door and sidelites constructed using fenestration frame assemblies.
Figure 32:
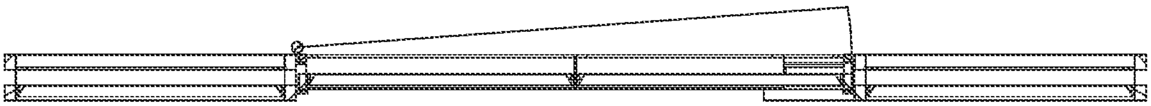
FIG. 32 is a sectional view taken along line A-A of FIG. 31.
Figure 33:
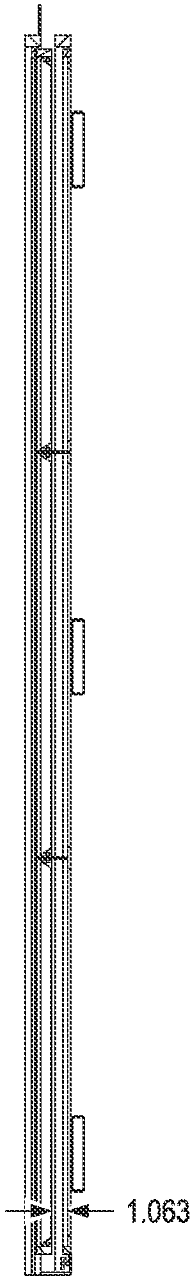
FIG. 33 is a sectional view taken along line B-B of FIG. 31.
Figure 34:
FIG. 34 is a sectional view taken along line C-C of FIG. 31.

FIGS. 31-34 are views showing an exemplary fenestration assembly (in this example, an entry door and sidelites) constructed using the fenestration systems described above. FIG. 31 is a front view of the entry door and sidelites assembly 42. FIG. 32 is a sectional view taken along line A-A of FIG. 31, showing door and sidelites (side windows). FIG. 33 is a sectional view taken along line B-B of FIG. 31, showing the door. FIG. 34 is a sectional view taken along line C-C of FIG. 31, showing the side window on the right of FIG. 31. Each of the fenestration structures (e.g., door, door frame, window frames, muntins, etc.) can be constructed using the teachings of the disclosure above.

When a fenestration assembly (e.g., window, door, etc.) is constructed using frame members and bridges as described above, numerous factors can be considered when locating and attaching bridges. For example, when constructing a door, extra bridge(s) (or a larger bridge) may be desired at the location of a hinge, latch, etc., to provide extra strength and/or a location on which to attach fasteners. Similarly, at other locations (e.g., at corners), it may be desired to add one or more bridges to provide a surface(s) for adhering insulators (plastic, FRP, fiberglass, etc.) or other materials that are part of the fenestration assembly.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the invention.

What is claimed is:

1. A thermally broken fenestration frame for a fenestration assembly comprising:

an interior frame member having a first end and a second end;

an exterior frame member disposed generally parallel to the interior frame member; and a plurality of bridges spaced apart along a length of the interior and exterior frame members between the first and second ends, each bridge of the plurality of bridges immovably coupled to both the interior frame member and the exterior frame member forming a plurality of thermal bridges extending between the interior frame member and the exterior frame member, wherein the interior frame member, exterior frame member, and bridges are comprised of a metallic material.

2. The thermally broken fenestration frame of claim 1, wherein the interior frame member, exterior frame member, and the plurality of bridges are comprised of the same material.

3. The thermally broken fenestration frame of claim 1, wherein the interior frame member, exterior frame member, and the plurality of bridges are comprised of steel.

4. The thermally broken fenestration frame of claim 1, wherein the interior frame member, exterior frame member, and the plurality of bridges are welded together.

5. The thermally broken fenestration frame of claim 1, wherein the interior frame member, exterior frame member, and the plurality of bridges are formed by a single piece of material.

6. The thermally broken fenestration frame of claim 1, wherein the plurality of bridges have a rectangular shape.

7. The thermally broken fenestration frame of claim 1, wherein the plurality of bridges have opposing first and second ends and a middle section, and wherein a cross section of the middle section is less than a cross section of the opposing first and second ends.

8. A method of providing structural rigidity and thermal isolation to a fenestration frame assembly, the method comprising:

providing an interior frame member having a first end and a second end;

providing an exterior frame member disposed generally parallel to the interior frame member; and forming a plurality of thermal bridges extending between the interior frame member and the exterior frame member by immovably coupling the interior frame member to the exterior frame member via a plurality of bridges spaced apart along a length of the interior and exterior frame members between the first and second ends, wherein the interior frame member, exterior frame member, and bridges are comprised of a metallic material.

9. The method of claim 8, wherein the interior frame member, exterior frame member, and the plurality of bridges are comprised of steel.

10. The method of claim 8, wherein coupling the interior frame member to the exterior frame member via the plurality of bridges further comprises welding each bridge to the interior frame member and the exterior frame member.

11. The method of claim 8, wherein the interior frame member, exterior frame member, and the plurality of bridges are formed by a single piece of material.

12. A fenestration assembly comprising:

a fenestration frame having a plurality of fenestration frame members forming a perimeter of the fenestration frame; and one or more fenestration panels coupled to the fenestration frame within the perimeter of the fenestration frame;

wherein each fenestration frame member further comprises:

an interior frame member having a first end and a second end, an exterior frame member disposed generally parallel to the interior frame member, and a plurality of bridges spaced apart along a length of the interior and exterior frame members between the first and second ends, each bridge of the plurality of bridges immovably coupled to both the interior frame member and the exterior frame member forming a plurality of thermal bridges extending between the interior frame member and the exterior frame member, wherein the interior frame member, exterior frame member, and bridges are comprised of a metallic material.

13. The fenestration assembly of claim 12, wherein the fenestration assembly comprises a window.

14. The fenestration assembly of claim 12, wherein the fenestration assembly comprises a door.

15. The fenestration assembly of claim 12, wherein the interior frame member, exterior frame member, and the plurality of bridges for a respective fenestration frame member are welded together.

16. The fenestration assembly of claim 12, wherein the plurality of bridges have a rectangular shape.

17. The fenestration assembly of claim 12, wherein the plurality of bridges have opposing first and second ends and a middle section, and wherein a cross section of the middle section is less than a cross section of the opposing first and second ends.

* * * * *